(12) United States Patent
Pirrung et al.

(10) Patent No.: US 11,492,501 B2
(45) Date of Patent: *Nov. 8, 2022

(54) DISPERSANT COMPOSITION

(71) Applicant: BASF SE, Ludwigshafen am Rhein (DE)

(72) Inventors: Frank Pirrung, Gruenstadt (DE); Matthias Maier, Sandhausen (DE); Sonja Gesine Gabriel, Ludwigshafen (DE); Steffen Onclin, Neustadt (DE)

(73) Assignee: BASF SE

( * ) Notice: Subject to any disclaimer, the term of this patent is extended or adjusted under 35 U.S.C. 154(b) by 0 days.

This patent is subject to a terminal disclaimer.

(21) Appl. No.: 16/070,641

(22) PCT Filed: Jan. 11, 2017

(86) PCT No.: PCT/EP2017/050459
§ 371 (c)(1),
(2) Date: Jul. 17, 2018

(87) PCT Pub. No.: WO2017/125290
PCT Pub. Date: Jul. 27, 2017

(65) Prior Publication Data
US 2019/0153245 A1    May 23, 2019

(30) Foreign Application Priority Data
Jan. 22, 2016    (EP) .................................... 16152442

(51) Int. Cl.
| C09D 7/45 | (2018.01) |
| C09D 17/00 | (2006.01) |
| C09B 67/46 | (2006.01) |
| C09K 23/00 | (2022.01) |
| C09K 23/14 | (2022.01) |
| C09K 23/16 | (2022.01) |

(52) U.S. Cl.
CPC .............. *C09D 7/45* (2018.01); *C09B 67/009* (2013.01); *C09D 17/001* (2013.01); *C09K 23/00* (2022.01); *C09K 23/017* (2022.01); *C09K 23/018* (2022.01); *C09K 23/14* (2022.01); *C09K 23/16* (2022.01)

(58) Field of Classification Search
CPC ................................ C09D 7/45; C09B 67/009
See application file for complete search history.

(56) References Cited

U.S. PATENT DOCUMENTS

| 4,918,317 A | 4/1990 | Hess et al. | |
| 5,340,394 A | 8/1994 | Elsamanoudi | |
| 8,735,474 B2 * | 5/2014 | Kniesel | C08K 5/5313 524/100 |
| 2003/0181544 A1 | 9/2003 | Thetford et al. | |
| 2006/0183815 A1 | 8/2006 | Alzer et al. | |
| 2006/0207476 A1 | 9/2006 | Coward et al. | |
| 2009/0131555 A1 | 5/2009 | Thetford | |
| 2010/0261634 A1 * | 10/2010 | Misske | C08G 73/024 510/299 |

FOREIGN PATENT DOCUMENTS

| DE | 2202527 | 9/1973 |
| DE | 19833347 A1 | 1/2000 |
| DE | 19835114 A1 | 2/2000 |
| EP | 0026914 A1 | 4/1981 |
| EP | 0218887 A2 | 4/1987 |
| EP | 0319337 A1 | 6/1989 |
| EP | 0383337 A2 | 8/1990 |

(Continued)

OTHER PUBLICATIONS

Extended European Search Report dated Jul. 8, 2016 in corresponding European Patent Application No. 16152442.6, 3 pages.
International Preliminary Report on Patentability and Written Opinion dated Jul. 24, 2018 in PCT/EP2017/050459 (English Translation only), 7 pages.
International Search Report dated Mar. 29, 2017, in PCT/EP2017/050459, filed Jan. 11, 2017.

*Primary Examiner* — Wenwen Cai
(74) *Attorney, Agent, or Firm* — Faegre Drinker Biddle & Reath LLP

(57) ABSTRACT

The present invention relates to a dispersant composition comprising: a) at least one oligomeric acid A, which has i) at least one acidic group selected from COOH and $PO_3H_2$, and ii) at least one polyoxyalkylene-ether radical of the formula (I): R—(O-A)$_x$O-G-, where A is an $C_2$-$C_4$-alkan-1,2-diyl radical; X is an integer having a number average value in the range from 2 to 20; and R is hydrocarbon radical having from 1 to 30 carbon atoms; G is a chemical bond or a carbonyl group; and b) at least one polyamine B, which is selected from the group consisting of polyvinylamines, poly-$C_2$-$C_3$-alkyleneimines, modified poly-$C_2$-$C_3$-alkyleneimines, melamine compounds, modified melamine compounds, poly-($C_2$-$C_4$-alkyleneether) amines, polyetheramine polyols, and modified polyetheramine polyols. The invention also relates to aqueous pigment compositions containing a dispersant composition as defined herein, a pigment component, selected from the group consisting of pigments and mixtures of at least one pigment and at least one filler, and an aqueous diluent.

17 Claims, No Drawings

(56) References Cited

FOREIGN PATENT DOCUMENTS

| EP | 0415273 | A2 | 3/1991 |
|----|---------|----|--------|
| EP | 1685895 | A2 | 8/2006 |
| WO | WO 01/51197 | A1 | 7/2001 |
| WO | WO 01/80987 | A2 | 11/2001 |
| WO | WO 2006/108856 | A2 | 10/2006 |
| WO | WO 2006/124264 | A1 | 11/2006 |
| WO | WO 2009/060059 | A2 | 5/2009 |
| WO | WO 2011/151277 | A1 | 12/2011 |
| WO | WO 2014/000842 | A1 | 1/2014 |

\* cited by examiner

DISPERSANT COMPOSITION

The present invention relates to novel dispersant compositions, which are useful for preparing aqueous pigment compositions, in particular low VOC pigment compositions, which can be used as colorants for coloring both solvent borne and water borne paints, stains or other coating compositions, in particular as colorants for use in point-of-sale tinting systems and in in-plant tinting systems.

BACKGROUND OF THE INVENTION

Pigments are ordinarily organic or inorganic dry powders that incorporate a mixture of primary particles, aggregates and agglomerates. For both industrial and consumer coating compositions, whether solvent borne or water borne, the pigment should be dispersed homogeneously throughout the coating composition in order to ensure a uniform appearance of the final coating. To properly be dispersed, pigments are usually wetted, deaggregated and deagglomerated in a vehicle to obtain a dispersion of the pigment particles. Wetting involves incorporation of the pigment into the vehicle replacing pigment-air interfaces with pigment-vehicle interfaces. Wetting agents facilitate bringing pigments into a dispersed state as a result of surface activity at the pigment-solution interface. An ideal pigment dispersion consists of a homogenous suspension of particles, after reducing the size of any aggregates and agglomerates.

While some organic vehicles may be good pigment wetting agents themselves, surfactants are typically added to the liquid vehicle to ensure thorough pigment dispersion throughout the vehicle. Surfactants can also be used to temporarily stabilize the pigment dispersion from re-aggregating and re-agglomerating. Problems that occur with current available pigment compositions include (i) a separation or settling of the compositions into their components over time, which can require periodic remixing or stirring, and (ii) an undesirable change in rheological profile.

Producers of coating compositions typically distribute premixed coating compositions in a small number of popular colors. To accommodate consumer desires and to enable matching of existing coated surfaces, manufacturers typically also distribute a set of tintable base coating compositions and several concentrated colorants. These colorants are combined at point-of-sale outlets using colorant dispensing and shaker mixing equipment to make small batch lots of custom-tinted coating compositions in a much larger array of colors than the limited colors available in premixed products.

The colorants are liquid compositions containing stably dispersed pigments. These pigment compositions can be added, alone or in combination with other colorants containing different pigments, to a base coating composition and mixed in to achieve a desired color of a ready for use (RFU) coating composition. A base coating composition differs from a RFU coating composition in that the color has not been finally adjusted. By having a number of the colorants each formulated using pigments of different hues, a large number of colored coating compositions can be provided by simply mixing at least one of the colorant(s) with the appropriate base coating composition in accordance with a predetermined recipe. Even more colors can be produced by providing a plurality of base coating compositions, themselves varying in hue, including clear base coating compositions.

The utility of known systems comprising colorants and base coating composition is that paints of many colors may be produced very quickly by simply mixing the required colorant composition(s) with the selected base coating composition. This is especially important for small stores where a very large range of colored coating compositions may be supplied on demand without the need for keeping a stock of coating composition covering the complete color range. Such in-store or point of sale (POS) tinting systems usually comprise up to twenty colorants (also known as tinters) and, say, three base coating compositions in each category. In this way light, medium and deep colors can be made. This is also important for producers of coating compositions, which want to economically produce coating composition covering the complete color range from a small number of solvent borne and water borne base coating compositions (so called in-plant tinting).

The colorants are usually housed in a tinting machine from which the individual colorants are dispensed according to the manufacturer's recipe from containers connected to or fitted with exit nozzles. Dosage may be manual or controlled by a computer. The problem with this type of system is that after dispensing is completed there is inevitably a residue of the colorant left in or on the nozzle that dries over time and partially or completely blocks the nozzle making subsequent accurate dispensing impossible. This is an even more severe problem for open nozzle tinting machines, which have nozzles without a tap or valve system to isolate the colorant from the atmosphere once an addition has been made. In such machines colorants remain exposed to the atmosphere and, unless properly formulated, will eventually dry and block the nozzle.

From an economical point of view, colorants used in POS tinting systems and for in-plant tinting should be capable of used for tinting both water borne paints, also termed latex paints, such as wall paints or architectural paints, and solvent-borne paints, such as alkyd paints. Such colorants are also termed universal colorants or universal pigment compositions, as they can be used for both water-borne and solvent borne coating compositions. From an ecological point of view, colorants used in POS tinting systems should have a low content of volatile organics (VOC), such that they can be used in low VOC paints or coatings.

U.S. Pat. No. 5,340,394 describes an aqueous universal pigment concentrate which can be used for tinting both water-borne and solvent-borne paints. The compositions contain, besides pigment and water, a polyethylene glycol, an alkyl polyglycosid and a non-ionic co-surfactant.

US 2006/0207476 describes an aqueous colorant composition containing a universal surfactant package comprising at least one alkyd-compatible surfactant and at least one latex-compatible surfactant.

WO 2011/151277 describes low VOC universal pigment compositions, which besides water and pigment, contain a non-volatile liquid, e.g. a polyethylene glycol, a stabilizing agent, such as fatty acid amide ethoxylates, alkyl glucosides, polyoxyethylene phosphate or phospholipids, such as soy lecithin, and a rheology modifying clay.

WO 2014/000842 describes aqueous universal pigment compositions, which besides water and pigment, contain an anionic or zwitterionic fatty acid condensation product and a nonionic surfactant.

Although a large number of stabilizing additives for universal pigment compositions have been described in the art, there is still a need for additives, which provide for a good rheological behavior of the pigment composition. The additives should allow for formulation of pigment compositions, which can be easily incorporated both in solvent borne and water borne coating compositions, which provide a high color strength, both in solvent borne and water borne coating compositions, and good rub out characteristics. Moreover, the additives should be compatible with other ingredients of the pigment compositions, such as humectants, and should not result in blocking the nozzles of a tinting machine. Moreover, the additives should be suitable for formulating low pigment compositions for low VOC coating compositions.

SUMMARY OF THE INVENTION

These and further objectives are solved by the dispersant composition as described herein, which contain at least one oligomeric acid A and at least one polyamine compound.

Therefore, the present invention relates to a dispersant composition comprising:
a) at least one oligomeric acid A, which has
 i. at least one acidic group selected from COOH and $PO_3H_2$ and
 ii. at least one polyoxyalkylene-ether radical of the formula (I)

$$R—(O-A)_x\text{-}O\text{-}G\text{-} \qquad (I)$$

where
 A is an $C_2$-$C_4$-alkan-1,2-diyl radical;
 X is an integer having a number average value in the range from 2 to 20 and
 R is hydrocarbon radical having from 1 to 30 carbon atoms;
 G is a chemical bond or a carbonyl group;
 and
b) at least one polyamine B, which is selected from the group consisting of polyvinylamines, poly-$C_2$-$C_3$-alkyleneimines, modified poly-$C_2$-$C_3$-alkyleneimines, melamine compounds, modified melamine compounds, poly-($C_2$-$C_4$-alkyleneether) amines, polyetheramine polyols, and modified polyetheramine polyols.

The invention also relates to aqueous pigment compositions containing a dispersant composition as defined herein, a pigment component, selected from the group consisting of pigments and mixtures of at least one pigment and at least one filler, and an aqueous diluent.

The surfactant combinations as described herein provide for a good rheological behavior of the pigment composition, and allow for formulation of universal pigment compositions, i.e. pigment compositions, which can be easily incorporated in both solvent borne and water borne coating compositions. Moreover, the surfactant combinations are compatible with other ingredients of the pigment compositions, such as humectants, and do not result in blocking the nozzles of a tinting machine.

Moreover, the additives are suitable for formulating pigment compositions having a low VOC or SVOC. The pigment compositions of the invention provide a high color strength both to solvent borne and to water borne coating compositions and good rub out characteristics.

The invention also relates to the use of such aqueous pigment compositions in point of sale tinting systems as colorants. The invention also relates to the use of such aqueous pigment compositions as colorants for in-plant tinting systems.

DETAILED DESCRIPTION OF THE INVENTION

Hydrocarbon radicals having 1 to 30 carbon atoms include but are not limited to:
 i. alkyl having 1 to 30 carbon atoms,
 ii. alkenyl having 2 to 30 carbon atoms,
 iii. cycloalkyl having 3 to 10 carbon atoms, which may be substituted by 1 to 6 alkyl groups, each of which may have 1 to 4 carbon atoms,
 iv. aryl having 6 to 10 carbon atoms, which may be substituted by 1 to 6 alkyl groups, each of which may have 1 to 6 carbon atoms,
 v. alkyl having 1 to 6 carbon atoms, which is substituted by cycloalkyl having 6 to 10 carbon atoms, which cycloalkyl may be substituted by 1 to 6 alkyl groups, each of which may have 1 to 6 carbon atoms,
 vi. alkyl having 1 to 6 carbon atoms, which is substituted by aryl having 6 to 10 carbon atoms, which may be substituted by 1 to 6 alkyl groups, each of which may have 1 to 6 carbon atoms.

Here and in the following the prefix $C_n$-$C_m$ indicates the number of carbon atoms a radical or compound may have. For example, the prefix $C_1$-$C_4$ indicates that the radical, moiety or compound may have from 1 to 4 carbon atoms.

Alkyl denominates a saturated linear or branched, acyclic hydrocarbon radical, which may have from 1 to 30 carbon atoms ($C_1$-$C_{30}$-alkyl). The term $C_1$-$C_6$-alkyl indicates alkyl having from 1 to 6 carbon atoms, such as methyl, ethyl, n-propyl, 2-propyl, n-butyl, 2-butyl, isobutyl, 1,1-dimethylethyl, n-pentyl, 2-pentyl, neopentyl, n-hexyl, 2-hexyl, 2-methylpentyl, 1,3-dimethylbutyl, 1-ethylbutyl, 2-ethylbutyl, etc. The term $C_6$-$C_{30}$-alkyl indicates alkyl having from 6 to 20 carbon atoms. Examples of $C_6$-$C_{30}$-alkyl include n-hexyl and its isomers, n-heptyl, 1-methylhexyl, 2-methylhexyl, 3-methylhexyl, 4-methylhexyl, 5-methylhexyl, 1-ethylpentyl, 2-ethylpentyl, 3-ethylpentyl, n-octyl, 1-methylheptyl, 2-methylheptyl, 1-ethylhexyl, 2-ethylhexyl, 1,2-dimethylhexyl, 1-propylpentyl, 2-propylpentyl, n-nonyl, decyl, 2-propylheptyl, 3-propylheptyl, n-undecyl, n-dodecyl, n-tridecyl, n-tetradecyl, n-hexadecyl, n-octadecyl, n-eicosyl, n-docosenyl (behenyl), lignoceryl and constitutional isomers of the aforementioned n-alkyl radicals.

Alkenyl denominates an ethylenically unsaturated linear or branched hydrocarbon radical, which may have from 2 to 30 carbon atoms ($C_2$-$C_{30}$-alkenyl).

Cycloalkyl denominates a saturated mono- or bicyclic hydrocarbon radical having usually 3 to 10 carbon atoms, monocyclic radicals, such as cyclopropyl, cyclobutyl, cyclopentyl, cycloheptyl, cyclooctyl, etc. Examples of bicyclic radicals comprise bicyclo[2.1.1]hexyl, bicyclo[2.2.1]heptyl, bicyclo[3.1.1]heptyl, bicyclo[2.2.1]heptyl, bicyclo[2.2.2]octyl and bicyclo[3.2.1]octyl.

Aryl denominates an aromatic hydrocarbon atom, such as phenyl or naphthyl, which may have a fused ring, such as in indanyl.

Alkylen and Alkandiyl denominate linear or branched, saturated bivalent hydrocarbon radicals having usually 1 to 8 carbon atoms, such as methylene, 1,2-ethandiyl, 1,1-ethandiyl, 1,1-propandiyl, 1,2-propandiyl, 2,2-propandiyl, 1,3-propandiyl, 2-methyl-2,3-propandiyl, 1,1-butandiyl, 1,2-butandiyl, 2,2-butandiyl, 2,3-butandiyl, 1,3-butandiyl and 1,4-butandiyl. Likewise, alkantriyl and alkantetrayl, denominate linear or branched, saturated tri- and tetravalent hydrocarbon radicals having usually 1 to 8 carbon atoms, such as ethan-1,1,2-triyl, propan-1,2,3-triyl.

The term $C_2$-$C_4$-alkan-1,2-diyl denominates a bivalent hydrocarbon radical having from 2 to 4 carbon atoms. Examples of $C_2$-$C_4$-alkan-1,2-diyl include ethan-1,2-diyl, propan-1,2-diyl, butan-1,2-diyl, and 2-methylpropan-1,2-diyl.

Alkendiyl denominates linear or branched, unsaturated bivalent hydrocarbon radicals having usually 2 to 8 carbon atoms, such as ethen-1,1-diyl (C=CH$_2$), ethen-1,2-diyl, (—CH=CH—), propen-1,2-diyl (—CH=C(CH$_3$)—), propen-2,3-diyl (—CH$_2$—C(=CH$_2$)—) or propen-1,3-diyl (—CH$_2$—CH=CH—). Likewise, alkantriyl and alkantetrayl, denominate linear or branched, saturated tri- and tetravalent hydrocarbon radicals having usually 2 to 8 carbon atoms, such as propen-1,2,3-triyl (—CH=C(—)—CH$_2$—).

Cycloalkandiyl denominates cyclic saturated bivalent hydrocarbon radicals having usually 3 to 8 carbon atoms, such as cyclopropane-1,1-diyl, cyclopropane-1,2-diyl, cyclobutan-1,1-diyl, cyclobutan-1,2-diyl, cyclobutan-1,3-diyl, cyclopentan-1,1-diyl, cyclopentan-1,2-diyl, cyclopentan-1,3-diyl, cyclohexan-1,1-diyl, cyclohexan-1,2-diyl, cyclohexan-1,3-diyl or cyclohexan-1,4-diyl.

The term "poly-(C$_2$-C$_4$-alkyleneether) modified" indicates a compound or group of compounds, which have been modified such that they carry at least one poly-(C$_2$-C$_4$-alkyleneether) radical. For example, compounds having primary and/or secondary amino groups can be modified by reacting them with a C$_2$-C$_4$-alkyleneoxide, thereby replacing at least one of their hydrogen atoms by a poly-(C$_2$-C$_4$-alkyleneether) radical. For example, compounds, which bear at least one acetal, aminal, semiacetal, semiaminal or carbamate group can be modified by reacting them with a hydroxyl terminated poly-(C$_2$-C$_4$-alkyleneether), thereby replacing a hydroxyl group in the semiacetal or semiaminal group or an alkoxy group of the acetal, aminal or carbamate group by a poly-(C$_2$-C$_4$-alkyleneether) radical.

The variables A, x and R in the polyoxyalkylene-ether radical of the formula (I) may individually on their own and preferably in combination have the following meanings:

A is selected from the group consisting of ethan-1,2-diyl and propan-1,2-diyl and combinations thereof and especially ethan-1,2-diyl;

x is an integer having a number average value in the range from 3 to 10; and

R is C$_1$-C$_{30}$-alkyl, in particular C$_6$-C$_{20}$-alkyl.

The number average molecular weight of the oligomeric acid A is frequently in the range from 200 to 2500 g/mol and in particular in the range from 250 to 2000 g/mol, as determined by GPC or MALDI.

In a first group of embodiments, the oligomeric acid A has at least one carboxyl group, in particular 1, 2 or 3 carboxyl groups. The carboxylic acid group is usually bound by a linker Q to the oxygen atoms or radical G, respectively, of the polyoxyalkylene-ether radical of the formula (I). The linker Q is typically a polyvalent hydrocarbon radical, which is optionally substituted by one or more, e.g. 1 or 2 hydroxyl groups or a phosphonate group, where the polyvalent hydrocarbon radical may be interrupted by 1 or 2 carboxyl groups and where the polyvalent hydrocarbon radical frequently has 2 to 16 carbon atoms, especially 2 to 10 or 2 to 8 carbon atoms.

Hence, the oligomeric acid A, which has at least one carboxyl group, can be described in particular by the following formula A1

[R—(O-A)$_x$O-G]$_y$-Q(COOH)$_z$ (A1)

where R, G, A and x are as defined above y indicates the number of polyoxyalkylene-ether radicals and is usually 1, 2 or 3;

z indicates the number of carboxyl groups and is usually 1, 2 or 3; and

G is a chemical bond or in particular a carbonyl group; and

Q represents a linker, which is typically a polyvalent hydrocarbon radical, which is optionally substituted by one or more, e.g. 1 or 2 hydroxyl groups, where the polyvalent hydrocarbon radical may be interrupted by 1 or 2 carboxyl groups and where the polyvalent hydrocarbon radical frequently has 2 to 16 carbon atoms, especially 2 to 10 or 2 to 8 carbon atoms.

In formula A1, y is preferably 1 or 2 and z is preferably 1 or 2. G is in particular a carbonyl group.

Examples of radicals Q include, but are not limited to

C$_1$-C$_8$-alkandiyl, optionally substituted by 1 or 2 OH, such as, —CH$_2$—, —CH$_2$—CH$_2$—, —CH$_2$—CH(OH)—, —CH(OH)—CH(OH)—, —CH$_2$—CH$_2$—CH$_2$—, —CH$_2$—CH$_2$—CH$_2$—CH$_2$—, C$_2$-C$_8$-alkantriyl and C$_3$-C$_8$-alkantetrayl, optionally substituted by 1 or 2 OH and/or interrupted by carboxyl, such as, —CH$_2$—C(—)(OH)—CH$_2$—, —CH(OH)—C(—)H—CH$_2$—, —CH$_2$—C(—)H—CH$_2$—, —CH$_2$—CH[OC(=O)—R$^a$—]—, —CH[OC(=O)—R$^a$—]—CH$_2$—, —CH(OH)—CH[OC(=O)—R$^a$—]—, —CH[OC(=O)—R$^a$—]—CH$_2$—, or —CH$_2$—CH[OC(=O)—R$^a$—]—CH$_2$, where R$^a$ is —CH$_2$—CH$_2$—, or —CH=CH—;

C$_2$-C$_8$-alkendiyl, such as —CH=CH—, —CH=C(CH$_3$)—, —CH$_2$—C(=CH$_2$)—, or, —CH$_2$—CH=CH—, C$_2$-C$_8$-alkentriyl, such as —CH=C(—)—CH$_2$—;

C$_3$-C$_6$-cycloalkandiyl, such as cyclohexan-1,2-diyl, cyclohexan-1,3-diyl or cyclohexan-1,4-diyl, phenylene and benzoltetrayl.

Preference is given to the radicals Q, selected from the group consisting of:

C$_1$-C$_6$-alkandiyl, optionally substituted by 1 or 2 OH, especially —CH$_2$—CH$_2$—, —CH$_2$—CH(OH)—, —CH$_2$—C(—)(OH)—CH$_2$—;

C$_2$-C$_6$-alkantriyl, optionally substituted by 1 or 2 OH and/or interrupted by carboxyl, especially —CH$_2$—CH[OC(=O)—CH$_2$—CH(OH)—]- or —CH$_2$—CH[OC(=O)—R$^a$—]—CH$_2$— and C$_2$-C$_6$-alkendiyl, especially —CH=CH—, —CH=C(CH$_3$)—, —CH$_2$—C(=CH$_2$)—, or, —CH$_2$—CH=CH—.

If the oligomeric acid A bears at least one carboxyl group, it is in particular characterized by an acid number in the range of from 20 to 200 mg KOH/g.

Oligomeric acids A, which bear at least one COOH group are principally known in the form of their salts as surfactants in cleaning compositions, such as household and industrial cleaners, laundry detergent compositions and dishwashing detergent compositions.

Frequently, the oligomeric acid A, which bears at least one COOH group is obtainable by reacting a polyether of formula (II)

R—(O-A)$_x$OH (II)

wherein R, A and x are as defined above, with at least one organic polycarboxylic acid comprising at least 2, e.g. 2, 3 or 4 carboxyl groups and optionally 1 or 2 hydroxyl groups and/or 1 phosphonic acid group, and having a total of 3 to 20 carbon atoms. Instead of the polycarboxylic acid, a C$_1$-C$_4$-alkylester, in particular a methyl ester, or an anhydride thereof can be used.

The number average molecular weight of the of the polyether (II) is frequently in the range from 200 to 2400 g/mol, in particular in the range from 250 to 1500 g/mol and especially in the range from 350 to 700 g/mol, as determined by GPC or MALDI.

Preferably, the polyether (II) is selected from $C_1$-$C_{30}$-alkylpolyethyleneoxides (A=1,2-ethandiyl, R=$C_1$-$C_{30}$-alkyl), $C_1$-$C_{30}$-alkylpolypropyleneoxides (A=1,2-propanediyl, R=$C_1$-$C_{30}$-alkyl) and $C_1$-$C_{30}$-alkylpoly(ethylenoxide-co-propyleneoxide)s (A=1,2-ethandiyl and 1,2-propanediyl, R=$C_1$-$C_{30}$-alkyl), in particular $C_6$-$C_{20}$-alkylpolyethyleneoxides (A=1,2-ethandiyl, R=$C_6$-$C_{20}$-alkyl), $C_6$-$C_{20}$-alkylpolypropyleneoxides (A=1,2-propanediyl, R=$C_6$-$C_{20}$-alkyl) and $C_6$-$C_{20}$-alkylpoly(ethylenoxide-co-propyleneoxide)s (A=1,2-ethandiyl and 1,2-propanediyl, R=$C_6$-$C_{20}$-alkyl). Polyethers of formula (II) are well known and commercially readily available.

The polycarboxylic acid may be described by the formula $Q(COOH)_{z+1}$, where Q and z are as described above.

Frequently, the polycarboxylic acid and the anhydrides thereof are selected from the group consisting of maleic acid, maleic acid anhydride, phthalic acid, phthalic acid anhydride, glutaric acid, glutaric acid anhydride, succinic acid, succinic acid anhydride, 1,2-cyclohexanedicarboxylic acid, 1,2-cyclohexanedicarboxylic acid anhydride, itaconic acid, itaconic acid anhydride, fumaric acid, pyromellitic dianhydride, citric acid, malic acid, tartaric acid, propane-1,2,3-tricarboxylic acid, aconitic acid, isocitric acid, and mixtures thereof.

Amongst the polycaboxylic acids, preference is given to succinic acid anhydride, itaconic acid anhydride, citric acid, malic acid and maleic anhydride.

Hence, the radical Q is especially selected from the following groups: —$CH_2$—$CH_2$—, —$CH_2$—$CH(OH)$—, —$CH_2$—$C(—)(OH)$—$CH_2$—, —$CH$=$CH$—; —$CH_2$—$CH[OC(=O)$—$CH_2$—$CH(OH)$—]- and —$CH_2$—$CH[OC(=O)$—$R^a$—]—$CH_2$—.

The reaction of the polyether of formula (II) with the polycarboxylic acid or the anhydride thereof can be performed in a single step. In this case, the relative molar amounts of polyether of formula (II) and polycarboxylic acid or its anhydride are chosen such that the carboxyl groups are not completely consumed. In particular, the relative amounts of the polyether of formula (II) and the polycarboxylic acid having z+1 carboxyl groups is chosen such that the molar ratio of the polyether of formula (II) to the amount of carboxylic acid is at most 0.8(z+1), in particular in the range of 0.3(z+1) to 0.8(z+1), especially in the range from 0.4(z+1) to 0.7(z+1).

The reaction of the polyether of formula (II) with the polycarboxylic acid or the anhydride thereof may also be performed in a two or 3 subsequent steps. For example, in a first step, the polyether of formula (II) is reacted with a polycarboxylic acid having one or more, e.g. 1 or 2 hydroxyl groups. Thereby an oligomeric acid is formed, which still may have OH groups, which are prone to an esterification. The first step may then be followed by one or more subsequent steps, where the hydroxyl groups are further reacted with a polycarboxylic acid or an anhydride thereof, such as maleic acid anhydride, itaconic acid anhydride or succinic acid anhydride. In this case, the relative molar amounts of polyether of (II) and polycarboxylic acid or its anhydride in the first step are chosen such that the carboxyl groups are not completely consumed. In particular, the relative amounts of the polyether of formula (II) and the polycarboxylic acid having z+1 carboxyl groups or (z+1)/2 anhydride groups is chosen such that the molar ratio of the polyether of formula (II) to the amount of carboxylic acid is at most 0.8(z+1), in particular in the range of 0.3(z+1) to 0.8(z+1), especially in the range from 0.4(z+1) to 0.7(z+1). In the second step, the relative amount of polycarboxylic acid (or anhydride) having z+1 carboxyl groups (or (z+1)/2 anhydride groups) and the reaction product of the first step is chosen such that the molar ratio of hydroxyl groups in the reaction product and polycarboxylic acid is in the range from 0.5(z+1) to 1.5(z+1).

The reaction of the polyether of formula (II) with the polycarboxylic acid or the anhydride thereof is frequently performed in the presence of an acidic or a basic catalyst, preferably an acidic catalyst and in particular a Lewis acid catalyst. However, Broenstedt catalysts can also be used. The amount of catalyst is frequently in the range from 0.01 to 2% by weight, in particular from 0.05 to 1% by weight, based on the total weight of polyether of formula (II) and polycarboxylic acid or the anhydride thereof. Examples of basic catalysts are tertiary amines, e.g. tri-$C_1$-$C_6$-alkylamines, such as triethylamine, tripropylamine, tributylamine, dimethylpropylamine, dimethylbutylamine, dimethyl-isopropylamine, di-$C_1$-$C_6$-alkyl-$C_5$-$C_6$-cycloalkylamines, such as dimethylcyclohexylamine, di-$C_1$-$C_6$-alkylpyridines, such as 4-dimethylaminopyridine. Example of Lewis acid catalysts include tin compound catalysts, such as dibutyltindioctoate and dibutyltindilaurate, and titanium(IV)alkoxides, such as tetrabutyltitanate and tetraisopropyltitanate. Suitable Broenstedt catalysts include but are not limited to organic sulfonic acids, e.g. alkylsulfonic acids, such as methyl or ethylsulfonic acid and arylsulfonic acid, such as phenylsulfonic acid or toluenesulfonic acid and other $C_1$-$C_4$-alkyl substituted phenyl sulfonic acids.

The reaction of the polyether of formula (II) with the polycarboxylic acid or the anhydride thereof is frequently performed at elevated temperatures, preferably at temperatures in the range from 70 to 230° C., in particular from 80 to 200° C. If the anhydrides of polycarboxylic acids are used, the reaction temperature is preferably in the range from 70 to 180° C., in particular from 80 to 160° C. If the polycarboxylic acids are used, the reaction temperature is preferably in the range from 100 to 230° C., in particular from 120 to 200° C.

The reaction of the polyether of formula (II) with the polycarboxylic acid or the anhydride thereof can be performed in an inert solvent, e.g. an aromatic hydrocarbon, or in bulk, the latter being preferred. It may be advantageous to remove water formed in the reaction, if a polycarboxylic acid is used.

The reaction time typically depends on the reactivity of the polyether (II), the polycarboxylic acid or its anhydride, the reaction temperature and the type and amount of catalyst used. Usually the reaction will be performed until either the theoretical amount of water has been formed and/or until the desired acid number is achieved.

In a second group of embodiments, the oligomeric acid A has at least one carbon bound $PO_3H_2$ group or a combination thereof with 1, 2 or 3 carboxyl groups. The $PO_3H_2$ group is then usually bound by a linker Q to the oxygen atoms of the polyoxyalkylene-ether radical of the formula (I). Hence, the oligomeric acid A, which has at least one $PO_3H_2$ group, can be described by the following formula A2

$$[R-(O-A)_x O-G]_y-Q(PO_3H_2)_p(COOH)_q \qquad (A2)$$

where R, G, A and x are as defined above y indicates the number of polyoxyalkylene-ether radicals and is usually 1, 2 or 3;

p indicates the number of $PO_3H_2$ groups and is usually 0, 1, 2 or 3;

q indicates the number of carboxyl groups and is usually 0, 1, 2 or 3; and

G is a chemical bond or in particular a carbonyl group, and

Q represents a linker, which is typically a polyvalent hydrocarbon radical, which is optionally substituted by one or more, e.g. 1 or 2 hydroxyl groups, where the polyvalent hydrocarbon radical may be interrupted by 1 or 2 carboxyl groups and where the polyvalent hydrocarbon radical frequently has 2 to 16 carbon atoms, especially 2 to 10 or 2 to 8 carbon atoms.

The preferred meanings and special meanings of the variables R, G, A, x, y, G and Q are the same as given for formula (A1).

Frequently, the oligomeric acid A of the second embodiment is obtained by reacting a polyether of formula (II), as described in the context of the first embodiment, with a phosphonocarboxylic acid or a suitable ester forming derivative thereof or with a phosphonoalkylhalide. The preparation of said oligomeric acid A of the second embodiment can be achieved by analogy to the process described for the preparation of the oligomeric acid A of the first embodiment.

In a third group of embodiments, the oligomeric acid A has one phosphate group $OPO_3H_2$. The phosphate group is usually bound directly to the polyether radical. The oligomeric acids A of the third group of embodiments can be described by the following formulae A3a and A3b

R—(O-A)$_x$O—PO$_3$H$_2$ (A3a)

[R—(O-A)$_x$O]$_2$—PO$_2$H (A3b)

where R, A and x are as defined above.

Oligomeric acids A, which bear at least one phosphate group and their salts are principally known as surfactants in cleaning compositions, such as household and industrial cleaners, laundry detergent compositions and dishwashing detergent compositions.

The oligomeric acid A of the third groups of embodiments can be obtained by reacting a polyether of formula (II), as described for the first group of embodiments with at least one phosphatizing agent. Suitable phosphatizing agents include, but are not limited to, phosphoric acid anhydride, oligomers of phosphoric acid, e.g. oligomers having from 2 to 10 phosphor atoms, e.g. triphosphoric acid, tetraphosphoric acid, pentaphosphoric acid, hexaphosphoric acid, and phosphoryl halides with subsequent hydrolysis. Preferably, the phosphatizing agent is an oligomer of phosphoric acid. Frequently, the relative amount of phosphatizing agent and polyether (II) is chosen such that the phosphatizing agent is completely consumed, i.e. the amount of hydroxyl groups in the polyether (II) exceed the amount of phosphor atoms in the phosphatizing agent.

The reaction of the polyether of formula (II) with the phosphatizing agent is frequently performed at elevated temperatures, preferably at temperatures in the range from 40 to 150° C., in particular from 50 to 100° C.

The reaction of the polyether of formula (II) with the phosphatizing agent is usually performed in bulk. The reaction time typically depends on the reactivity of the polyether (II), the phosphatizing agent and the reaction temperature. Usually the reaction will be performed until either the theoretical amount of water has been formed and/or until the desired acid number is achieved.

The dispersant composition of the invention also contains at least one polyamine B. Said polyamine B serves for at least partially neutralizing the acidic groups of the oligomeric acid A and improves the dispersant properties and compatibility with other ingredients of an aqueous pigment composition.

The relative amounts of the oligomeric acid and the polyamine B in the dispersant composition are preferably such that the weight ratio of the oligomeric acid A and the polyamine, i.e. the weight ratio A:B is in the range of 20:80 to 80:20, in particular from 30:70 to 70:30.

The dispersant composition of the invention may formulated as a premix of the components A and B, which is than formulated into the aqueous pigment composition or it may be formulated separately into the into the aqueous pigment composition, i.e. components A and B are combined upon formulation of the pigment composition.

The polyamine B is characterized by having a plurality of basic nitrogen atoms per molecule. The nitrogen atoms may be present in the form of primary, secondary or tertiary amine groups and/or in the form of imino-nitrogens, which are ring members of a heteroaromatic triazine ring, in case of the melamine derivatives.

Frequently, the polyamine B has an amine number in the range from 10 to 1500 mg KOH/g. The amine number will depend from the type of polyamine B and plays only a minor role.

Frequently, the polyamine B has a number average weight in the range from 200 to 50,000 Dalton, in particular in the range from 500 to 20,000 Dalton.

Preferably, the polyamine B bears one poly-($C_2$-$C_4$-alkyleneether) group, in particular selected from polyethyleneoxide groups, poly(ethyleneoxide-co-propyleneoxide) groups and polypropyleneoxide groups, where the poly-($C_2$-$C_4$-alkyleneether) group may be non-capped, i.e. terminated with a OH group, or capped, e.g. by a $C_1$-$C_{20}$-alkyl group (hereinafter termed $C_1$-$C_{20}$-alkyl terminated poly-($C_2$-$C_4$-alkyleneether) group). The poly-($C_2$-$C_4$-alkyleneether) groups will frequently have on a number average from 3 to 80, in particular from 5 to 50 $C_2$-$C_4$-alkyleneoxide repeating units, i.e. the number average weight of the poly-($C_2$-$C_4$-alkyleneether) group will frequently be in the range from 150 to 5,000 Dalton, in particular from 200 to 2,500 Dalton. If present, the relative amount of poly-($C_2$-$C_4$-alkyleneether) groups to the total weight of the polyamine B is generally at least 10% by weight, in particular at least 30% by weight, especially at least 50% by weight and may be as high as 99% by weight or 98% by weight.

According to the invention the polyamine B is selected from the following groups i. to viii, in particular from groups ii., iii. and v. and from mixtures thereof:

i. polyvinylamines, i.e. polymers essentially formed by repeating units of the formula $CH_2$—$CH(NH_2)$ and optionally repeating units of the formula $CH_2CH(NHR)$, where R is an acyl radical such as formyl (CHO), acetyl or propionyl, in particular partially or completely hydrolysed polyvinylformamides having a degree of hydrolysis of at least 80%;

ii. poly-$C_2$-$C_3$-alkyleneimines, e.g. linear or branched polyethylene imines, in particular polyethylene imines having a number average molecular weight in the range from 250 to 50,000;

iii. modified poly-$C_2$-$C_3$-alkyleneimines, such as
  a. poly-($C_2$-$C_4$-alkyleneether) modified poly-$C_2$-$C_3$-alkyleneimines, i.e. poly-$C_2$-$C_3$-alkyleneimines, in particular polyethyleneimines, as described before under item ii., wherein at least a portion, e.g. from 30 to 100 mol-%, especially from 80 to 100 mol-%, of the hydrogen atoms of the primary and secondary aminogroups of the poly-$C_2$-$C_3$-alkyleneimine are replaced by poly-($C_2$-$C_4$-alkyleneether) radicals, e.g. by reacting the poly-$C_2$-$C_3$-alkyleneimine with an $C_2$-$C_4$-alkyleneoxide or a mixture of alkyleneoxides, such as ethyleneoxide, propyleneoxide, 1,2-butyleneoxide, 2,3-butyleneoxide or 2-methyl-1,2-propyleneoxide. In the poly-($C_2$-$C_4$-alkyleneether) modified poly-$C_2$-$C_3$-alkyleneimines the poly-($C_2$-$C_4$-alkyleneether) groups are in particular OH terminated polyethyleneoxide groups or OH terminated poly(ethyleneoxide-co-propyleneoxide) groups. In the poly-($C_2$-$C_4$-alkyleneether) modified poly-$C_2$-$C_3$-alkyleneimines the poly-($C_2$-$C_4$-alkyleneether) groups will frequently have on a number average from 3 to 80, in particular from 5 to 50 $C_2$-$C_4$-alkyleneoxide repeating units, per nitrogen atom. In the poly-($C_2$-$C_4$-alkyleneether) modified poly-$C_2$-$C_3$-alkyleneimines the amount of poly-($C_2$-$C_4$-alkyleneether) groups is generally at least 30% by weight, in particular at least 50% by weight, especially at least 70% by weight, e.g. from 50 to 99% by weight, especially from 70 to 98% by weight, based on the total weight of the poly-($C_2$-$C_4$-alkyleneether) modified poly-$C_2$-$C_3$-alkyleneimine;

b. poly-$C_2$-$C_3$-alkyleneimines, in particular polyethyleneimines, as described before under item ii., wherein at least a portion, e.g. from 30 to 100 mol-%, especially from 80 to 100 mol-%, of the hydrogen atoms of the primary and secondary aminogroups of the poly-$C_2$-$C_3$-alkyleneimine are replaced by $C_2$-$C_{20}$-acyl radicals, e.g. by reacting the poly-$C_2$-$C_3$-alkyleneimine with a $C_2$-$C_{20}$-alkanoic acid or an amide forming derivative thereof;

c. poly-($C_2$-$C_4$-alkyleneether) modified poly-$C_2$-$C_3$-alkyleneimines as described herein under item iii.a, wherein some, e.g. from 10 to 50%, of the terminal hydroxyl groups of the poly-($C_2$-$C_4$-alkyleneether) moieties are modified by acyl or carbamate groups, in particular by, e.g. by $C_1$-$C_{20}$-alkylcarbonyl or N—$C_1$-$C_{20}$-alkylcarbamate groups. These modified poly-($C_2$-$C_4$-alkyleneether) modified poly-$C_2$-$C_3$-alkyleneimines can be obtained by reacting a poly-($C_2$-$C_4$-alkyleneether) modified poly-$C_2$-$C_3$-alkyleneimine with a $C_2$-$C_{20}$-alkanoic acid or an ester forming derivative thereof or by reacting a poly-($C_2$-$C_4$-alkyleneether) modified poly-$C_2$-$C_3$-alkyleneimine with a $C_1$-$C_{20}$-alkyl isocyanate. In these modified poly-($C_2$-$C_4$-alkyleneether) modified poly-$C_2$-$C_3$-alkyleneimines the amount of poly-($C_2$-$C_4$-alkyleneether) groups is generally at least 20% by weight, in particular at least 40% by weight, especially at least 60% by weight, e.g. from 40 to 98% by weight, especially from 60 to 95% by weight, based on the total weight of the poly-($C_2$-$C_4$-alkyleneether) modified poly-$C_2$-$C_3$-alkyleneimine. In these modified poly-($C_2$-$C_4$-alkyleneether) modified poly-$C_2$-$C_3$-alkyleneimines the amount of acyl or carbamate groups will be in the range from 1 to 30% by weight, in particular from 2 to 20% by weight, based on the total weight of the poly-($C_2$-$C_4$-alkyleneether) modified poly-$C_2$-$C_3$-alkyleneimine;

iv. melamine compounds or melamines, respectively, which include but are not limited to melamine (2,4,6-triamino-s-triazine), precondensates of melamine with one or more aldehydes, e.g. benzaldehyde or $C_1$-$C_{10}$-alkanals, such as formaldehyde, acetaldehyde, propionaldehyde or butyraldehyde, which are preferably partially or completely etherfied with at least one $C_1$-$C_4$-alkanol, in particular with etherfied or with methanol, thereby obtaining modified melamine or melamine oligomers having aminal or semiaminal groups. The precondensates preferably have a molecular weight (number average) in the range from 250 to 2,000 Dalton. Melamines also include melamine compounds, wherein at least one of the amino groups of melamine and in particular all of them have been modified as a carbamate group, e.g. as a $C_1$-$C_{10}$-alkyl carbamate group;

v. poly-($C_2$-$C_4$-alkyleneether) modified melamines, are melamine compounds, which bear on an average at least 0.5 poly-($C_2$-$C_4$-alkyleneether) groups, in particular at least one poly-($C_2$-$C_4$-alkyleneether) group per melamine ring, e.g. from 0.5 to 6, in particular from 1 to 4 poly-($C_2$-$C_4$-alkyleneether) groups per melamine ring. The poly-($C_2$-$C_4$-alkyleneether) modified melamines may have one melamine ring or they may be oligomers having more than one melamine ring, e.g. on average 1.1 to 10 melamine rings, per molecule. The poly-($C_2$-$C_4$-alkyleneether) groups of the poly-($C_2$-$C_4$-alkyleneether) modified melamines are usually bound to the amino groups of the melamine ring via a bivalent linker, e.g. a moiety CRR', where R and R' are hydrogen or $C_1$-$C_{10}$-alkyl, or CRR' is a C=O group. In the poly-($C_2$-$C_4$-alkyleneether) modified melamines the poly-($C_2$-$C_4$-alkyleneether) groups are in particular $C_1$-$C_{20}$-alkyl terminated poly-($C_2$-$C_4$-alkyleneoxide) groups, more particularly $C_1$-$C_{20}$-alkyl terminated polyethyleneoxide or $C_1$-$C_{20}$-alkyl terminated poly(ethyleneoxide-co-propyleneoxide) groups, especially methyl terminated polyethyleneoxide groups. In the poly-($C_2$-$C_4$-alkyleneether) modified melamines the poly-($C_2$-$C_4$-alkyleneether) groups will frequently have a number average weight in the range from 150 to 5,000 Dalton, in particular from 200 to 2,500 Dalton. In the poly-($C_2$-$C_4$-alkyleneether) modified melamines the amount of poly-($C_2$-$C_4$-alkyleneether) groups is generally at least 10% by weight, in particular at least 30% by weight, especially at least 50% by weight, e.g. from 30 to 95% by weight, especially from 50 to 90% by weight, based on the total weight of the poly-($C_2$-$C_4$-alkyleneether) modified melamine. In addition to the poly-($C_2$-$C_4$-alkyleneether) groups the poly-($C_2$-$C_4$-alkyleneether) modified melamines may carry one or more $C_6$-$C_{22}$ alkoxy and/or $C_6$-$C_{22}$ alkenyloxy groups, which are bound to the amino groups of the melamine ring via a bivalent linker, e.g. a moiety CRR', where R and R' are hydrogen or $C_1$-$C_{10}$-alkyl, or CRR' is a C=O group;

vi. poly-($C_2$-$C_4$-alkyleneether) amines, i.e. linear or branched poly-($C_2$-$C_4$-alkyleneether), which bear terminal amino groups;

vii. polyetheramine polyols, e.g. oligomers, which are obtainable by polycondensation of di- or tri-$C_2$-$C_4$-alkanolamines, in particular those, which have a number average weight in the range from 500 to 50,000 Dalton and/or an amine number in the range of 200 to 800 mg KOH/g;

viii. modified polyetheramine polyols, e.g. polyetheramine polyols, where at least a part of the hydroxyl groups of the polyetheramine polyols are modified by acyl or carbamate groups, e.g. compounds which are obtained by reacting a polyetheramine polyols with a $C_2$-$C_{20}$-alkanoic acid or an ester forming derivative thereof or by reacting a polyetheramine polyols with a $C_1$-$C_{20}$-alkyl isocyanate.

More particularly, the polyamine B is selected from the group consisting of the polyamines of group ii., iii.a, iii.c and iv.

In a first particular group of embodiments the polyamine B is selected from polyethyleneimines, in particular from branched polyethyleneimines, in particular from polyethylene imines having a number average molecular weight in the range from 500 to 50,000, in particular from 1,000 to 20,000.

In a second particular group of embodiments the polyamine B is selected from poly-($C_2$-$C_4$-alkyleneether) modified polyethyleneimines, in particular from poly-($C_2$-$C_4$-alkyleneether) modified branched polyethyleneimines, in particular from poly-($C_2$-$C_4$-alkyleneether) modified polyethylene imines based on polyethyleneimines having a number average molecular weight in the range from 250 to 10,000, in particular from 500 to 5,000. In the poly-($C_2$-$C_4$-alkyleneether) modified polyethyleneimines the poly-($C_2$-$C_4$-alkyleneether) groups are in particular OH terminated polyethyleneoxide groups or OH terminated poly(ethyleneoxide-co-propyleneoxide) groups. In the poly-($C_2$-$C_4$-alkyleneether) modified polyethyleneimines the poly-($C_2$-$C_4$-alkyleneether) groups will frequently have on a number average from 3 to 80, in particular from 5 to 50 $C_2$-$C_4$-alkyleneoxide repeating units, per nitrogen atom. In the poly-($C_2$-$C_4$-alkyleneether) modified polyethyleneimines the amount of poly-($C_2$-$C_4$-alkyleneether) groups is generally at least 30% by weight, in particular at least 50% by weight, especially at least 70% by weight, e.g. from 50 to 99% by weight, especially from 70 to 98% by weight, based on the total weight of the poly-($C_2$-$C_4$-alkyleneether) modified polyethyleneimine. The number average weight of the poly-($C_2$-$C_4$-alkyleneether) modified polyethyleneimine will frequently be in the range from 1,000 to 50,000 Dalton, in particular from 2,000 to 20,000 Dalton.

Such poly-($C_2$-$C_4$-alkyleneether) modified polyethyleneimines can be prepared e.g. by reacting the polyethyleneimine with an $C_2$-$C_4$-alkyleneoxide or a mixture of alkyleneoxides, such as ethyleneoxide, propyleneoxide, 1,2-butyleneoxide, 2,3-butyleneoxide or 2-methyl-1,2-propyleneoxide. Suitable methods for preparation of poly-($C_2$-$C_4$-alkyleneether) modified polyethyleneimines are described e.g. in WO 2006/108856 and WO 2009/060059 and the prior art cited therein.

In a third particular group of embodiments the polyamine B is selected from poly-($C_2$-$C_4$-alkyleneether) modified polyethyleneimines, in particular from poly-($C_2$-$C_4$-alkyleneether) modified branched polyethyleneimines, in particular from poly-($C_2$-$C_4$-alkyleneether) modified polyethylene imines based on polyethyleneimines having a number average molecular weight in the range from 250 to 10,000, in particular from 500 to 5,000, wherein some, e.g. from 10 to 50%, of the terminal hydroxyl groups of the poly-($C_2$-$C_4$-alkyleneether) moieties are modified by acyl or carbamate groups, in particular by, e.g. by $C_1$-$C_{20}$-alkylcarbonyl or N—$C_1$-$C_{20}$-alkylcarbamate groups. These modified poly-($C_2$-$C_4$-alkyleneether) modified polyethyleneimines can be obtained by reacting a poly-($C_2$-$C_4$-alkyleneether) modified polyethyleneimine with a $C_2$-$C_{20}$-alkanoic acid or an ester forming derivative thereof or by reacting a poly-($C_2$-$C_4$-alkyleneether) modified polyethyleneimine with a $C_1$-$C_{20}$-alkyl isocyanate. In these modified poly-($C_2$-$C_4$-alkyleneether) modified polyethyleneimines the amount of poly-($C_2$-$C_4$-alkyleneether) groups is generally at least 20% by weight, in particular at least 40% by weight, especially at least 60% by weight, e.g. from 40 to 98% by weight, especially from 60 to 95% by weight, based on the total weight of the poly-($C_2$-$C_4$-alkyleneether) modified polyethyleneimine. In these modified poly-($C_2$-$C_4$-alkyleneether) modified polyethyleneimines the amount of acyl or carbamate groups will be in the range from 1 to 30% by weight, in particular from 2 to 20% by weight, based on the total weight of the poly-($C_2$-$C_4$-alkyleneether) modified polyethyleneimine. The number average weight of the modified poly-($C_2$-$C_4$-alkyleneether) modified polyethyleneimine will frequently be in the range from 2,000 to 20,000 Dalton.

In a fourth particular group of embodiments the polyamine B is selected from poly-($C_2$-$C_4$-alkyleneether) modified melamines, i.e. melamine compounds, which bear on an average at least 0.5 poly-($C_2$-$C_4$-alkyleneether) groups, in particular at least one poly-($C_2$-$C_4$-alkyleneether) group per melamine ring, e.g. from 0.5 to 6, in particular from 1 to 4 poly-($C_2$-$C_4$-alkyleneether) groups per melamine ring. The melamine compounds may have one melamine ring or they may be oligomers having more than one melamine ring, e.g. on a number average 1.1 to 10, in particular 1.2 to 5 melamine rings, per molecule. The poly-($C_2$-$C_4$-alkyleneether) groups of the poly-($C_2$-$C_4$-alkyleneether) modified melamines are usually bound to the amino groups of the melamine ring via a bivalent linker, e.g. a moiety CRR', where R and R' are hydrogen or $C_1$-$C_{10}$-alkyl, or CRR' is a C=O group. In the poly-($C_2$-$C_4$-alkyleneether) modified melamines the poly-($C_2$-$C_4$-alkyleneether) groups are in particular $C_1$-$C_{20}$-alkyl terminated poly-($C_2$-$C_4$-alkyleneoxide) groups, more particularly $C_1$-$C_{20}$-alkyl terminated polyethyleneoxide or $C_1$-$C_{20}$-alkyl terminated poly(ethyleneoxide-co-propyleneoxide) groups, especially methyl terminated polyethyleneoxide groups. In the poly-($C_2$-$C_4$-alkyleneether) modified melamines the poly-($C_2$-$C_4$-alkyleneether) groups will frequently have a number average weight in the range from 150 to 5,000 Dalton, in particular from 200 to 2,500 Dalton. In the poly-($C_2$-$C_4$-alkyleneether) modified melamines the amount of poly-($C_2$-$C_4$-alkyleneether) groups is generally at least 10% by weight, in particular at least 30% by weight, especially at least 50% by weight, e.g. from 30 to 95% by weight, especially from 50 to 90% by weight, based on the total weight of the poly-($C_2$-$C_4$-alkyleneether) modified melamine. In addition to the poly-($C_2$-$C_4$-alkyleneether) groups the poly-($C_2$-$C_4$-alkyleneether) modified melamines may carry one or more $C_6$-$C_{22}$ alkoxy and/or $C_6$-$C_{22}$ alkenyloxy groups, which are bound to the amino groups of the melamine ring via a bivalent linker, e.g. a moiety CRR', where R and R' are hydrogen or $C_1$-$C_{10}$-alkyl, or CRR' is a C=O group.

Such poly-($C_2$-$C_4$-alkyleneether) modified melamines can be prepared e.g. by reacting melamine compound having aminal, semiaminal or an O-alkyl carbamate group with a $C_1$-$C_{20}$-alkyl terminated poly-($C_2$-$C_4$-alkyleneoxide), more particularly with a $C_1$-$C_{20}$-alkyl terminated polyethyleneoxide or $C_1$-$C_{20}$-alkyl terminated poly(ethyleneoxide-co-propyleneoxide), especially with a methyl terminated polyethyleneoxide. The amount of $C_1$-$C_{20}$-alkyl terminated poly-($C_2$-$C_4$-alkyleneoxide) groups will frequently be from 0.5 to 6 mol, in particular from 1 to 4 mol per mol of melamine rings. A part, e.g. from 10 to 50 mol-% of the $C_1$-$C_{20}$-alkyl terminated poly-($C_2$-$C_4$-alkyleneoxide) can be replaced by long chain mono-alcohols, e.g. by $C_6$-$C_{22}$ alkanols or $C_6$-$C_{22}$ alkenols, such as stearyl alcohol or oleyl alcohol.

Suitable melamine compounds as starting materials for preparing poly-($C_2$-$C_4$-alkyleneether) modified melamines include, e.g. melamine precondensates, i.e. reaction product of melamine with an aldehyde, e.g. benzaldehyde or a $C_1$-$C_{10}$-alkanal, such as formaldehyde, acetaldehyde, propionaldehyde or butyraldehyde, which is preferably partially or completely etherified with at least one $C_1$-$C_4$-alkanol, in particular etherified with methanol. Frequently, the melamine precondensates are oligomers which have more than one melamine ring, e.g. on an average (number average) 1.1 to 10, in particular 1.2 to 5 melamine rings, per molecule. In the melamine precondensates the ratio of chemically bound aldehyde to melamine is in the range from 2 to 6. Preferably, the degree of the etherification is from 20 to 100 mol-% per mol aldehyde. These precondensates are known, e.g. from Kirk-Othmer, Encyclopedia of Chemical Technology, 3rd edition, Vol. 2, pp. 440-469, U.S. Pat. No. 4,918,317, EP 26914, EP 218887, EP 319337, EP 383,337, EP 415273, DE 19833347, DE 19835114 and WO 01/51197. Suitable precondensates are commercially available, e. g. Cymel types, such as but not limited to Cymel® 303, 327, 328 or 385 (etherified melamine formaldehyde resins of Cytec), Maprenal® types, such as but not limited to Maprenal® MF 900w/95, MF 915/751B, MF 920/75WA, MF 921w/85WA, (etherified melamine formaldehyde resins of Ineos), Kauramin® types of BASF SE, such as but not limited to Kauramin® 783, Kauramin® 792 or Kauramin® 753 (melamine formaldehyde resins), Luracoll® types of BASF SE, such as Luracoll® SD (etherified melamine formaldehyde resins) and Luwipal® types of BASF SE, such as but not limited to Luwipal® 063, Luwipal® 069 (etherified melamine formaldehyde resins). Suitable melamine compounds as starting materials for preparing poly-($C_2$-$C_4$-alkyleneether) modified melamines also include carbamates of melamine, i.e. compounds of the formula:

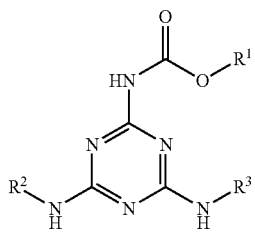

where $R^1$ is $C_1$-$C_{10}$ alkyl and $R^2$ and $R^3$ are, independently of each other, hydrogen or a group $C(=O)$—O—$R^1$.

The $C_1$-$C_{20}$-alkyl terminated poly-($C_2$-$C_4$-alkyleneoxide) which is reacted with the melamine compound having aminal, semiaminal or an O-alkyl carbamate group will frequently have a number average weight in the range from 150 to 5,000 Dalton, in particular from 200 to 2,500 Dalton. The amount of the $C_1$-$C_{20}$-alkyl terminated poly-($C_2$-$C_4$-alkyleneoxide) is generally chosen that it is from 0.5 to 6 mol, in particular from 1 to 4 mol per mol of melamine rings. In particular, the weight ratio of the $C_1$-$C_{20}$-alkyl terminated poly-($C_2$-$C_4$-alkyleneoxide) to the melamine compound is in the range from 1:3 to 20:1, especially from 1:1 to 10:1.

The reaction of the $C_1$-$C_{20}$-alkyl terminated poly-($C_2$-$C_4$-alkyleneoxide) and optionally the long chain mono-alcohol with the melamine compound having aminal, semiaminal or an O-alkyl carbamate group is frequently performed in the presence of an acidic or a basic catalyst, preferably an acidic catalyst and in particular a Broenstedt acid catalyst. However, Lewis acid catalysts can also be used. The amount of catalyst is frequently in the range from 0.05 to 2% by weight, in particular from 0.1 to 1% by weight, based on the total weight of $C_1$-$C_{20}$-alkyl terminated poly-($C_2$-$C_4$-alkyleneoxide) and melamine compound. Suitable Broenstedt catalysts include but are not limited to organic sulfonic acids, e.g. alkylsulfonic acids such as methyl or ethylsulfonic acid and arylsulfonic acid such as phenylsulfonic acid or toluenesulfonic acid. The reaction is frequently performed at temperatures in the range from 80 to 180° C., in particular from 90 to 160° C.

Poly-($C_2$-$C_4$-alkyleneether) modified melamines can also be prepared e.g. by reacting melamine with an aldehyde, e.g. benzaldehyde or a $C_1$-$C_{10}$-alkanal, such as formaldehyde, acetaldehyde, propionaldehyde or butyraldehyde, and a $C_1$-$C_{20}$-alkyl terminated poly-($C_2$-$C_4$-alkyleneoxide), optionally in combination with long chain mono-alcohol, thereby obtaining melamine precondensate modified with one or more poly-($C_2$-$C_4$-alkyleneether) groups per melamine ring. The molar ratio of melamine to aldehyde is generally in the range of 1:1.5 to 1:10, in particular in the range of 1:3 to 1:8 preferably in the range of 1:4 to 1:6. The molar ratio of poly-($C_2$-$C_4$-alkyleneether) to melamine is generally from 0.5 to 6 mol, in particular from 1 to 4 mol per mol of melamine. In particular, the weight ratio of the $C_1$-$C_{20}$-alkyl terminated poly-($C_2$-$C_4$-alkyleneoxide) to the melamine is in the range from 1:1 to 40:1, especially from 2:1 to 20:1. The reaction is frequently performed in the presence of an acidic catalyst, and in particular a Broenstedt acid catalyst. However, Lewis acid catalysts can also be used. The amount of catalyst is frequently in the range from 0.05 to 2% by weight, in particular from 0.1 to 1% by weight, based on the total weight of $C_1$-$C_{20}$-alkyl terminated poly-($C_2$-$C_4$-alkyleneoxide) and melamine compound. Suitable Broenstedt catalysts include but are not limited to organic sulfonic acids, e.g. alkylsulfonic acids such as methyl or ethylsulfonic acid and arylsulfonic acid such as phenylsulfonic acid or toluenesulfonic acid. The reaction is frequently performed at temperatures in the range from 80 to 180° C., in particular from 90 to 160° C.

The dispersant composition of the invention is suitable for dispersing pigment materials both in aqueous and non-aqueous media. The dispersant compositions of the invention are particularly useful as a dispersant in an aqueous pigment composition, in particular in aqueous concentrate pigment compositions, which shall be used as a colorant for pigment containing coating compositions, e.g. in point of sale colorant or tinting systems as described in U.S. Pat. No. 5,340,394, US 2006/0207476, WO 2011/151277 or WO 2014/000842.

Therefore, the present invention relates to the use of the dispersant compositions described herein in an aqueous pigment composition, in particular in an aqueous concentrate pigment composition, which can be used as a universal pigment composition in point of sale tinting systems.

The present invention also relates to aqueous pigment compositions, comprising a dispersant composition as defined herein, a pigment material and an aqueous diluent.

The term "pigment materials", as used herein, includes both pigments and fillers. In the pigment composition of the invention, the pigment material is in particular selected from the group consisting of pigments and mixtures of at least one pigment and at least one filler. Pigments include organic pigments, inorganic pigments and luster pigments/perlescent flakes.

Examples of suitable organic pigments include azo pigments, disazo pigments, naphthol pigments, benzimidazolone pigments, disazocondensation pigments, metal complex pigments, isoindolinone pigments, isoindoline pigments, the chinophthalon pigments, dioxazine pigments and the polycyclic pigment group consisting of indigo, thioindigo, quinacridones, phthalocyanines, perylenes, perionones, anthraquinones, such as aminoanthraquinones or hydroxyanthraquinones, anthrapyrimidines, indanthrones, flavanthrones, pyranthrones, anthantrones, isoviolanthrones, diketopyrrolopyrrole, and carbazoles, e.g. carbazole violet, and the like. Further examples of organic pigments can be found in the monograph: W. Herbst, K. Hunger "*Industrielle Organische Pigmente*" 2$^{nd}$ Edition, 1995, VCH Verlagsgesellschaft, ISBN: 3-527-28744-2.

Representative examples of organic pigments are:

Monoazo pigments: C.I. Pigment Yellow 1, 3, 62, 65, 73, 74, 97, 183 and 191; C.I. Pigment Orange 5, 38 and 64; C.I. Pigment Red 1, 2, 3, 4, 5, 23, 48:1, 48:2, 48:3, 48:4, 49, 49:1, 51, 51:1, 52:1, 52:2, 53, 53:1, 53:3, 57:1, 58:2, 58:4, 63, 112, 146, 148, 170, 184, 187, 191:1, 210, 245, 247 and 251;

Disazo pigments: C.I. Pigment Yellow 12, 13, 14, 16, 17, 81, 83, 106, 113, 126, 127, 155, 170, 174, 176 and 188; C.I. Pigment Orange 16, 34 and 44;

Disazocondensation pigments: C.I. Pigment Yellow 93, 95 and 128; C.I. Pigment Red 144, 166, 214, 220, 221, 242 and 262; C.I. Pigment Brown 23 and 41;

Anthanthrone pigments: C.I. Pigment Red 168;

Anthrachinone pigments: C.I. Pigment Yellow 147 and 199; C.I. Pigment Red 177;

Anthrapyrimidine pigments: C.I. Pigment Yellow 108;

Benzimidazolone pigments: C.I. Pigment Yellow 120, 151, 154, 180, 181; C.I. Pigment Orange 36 and 72, C.I. Pigment Red 175, 185, 208; C.I. Pigment Brown 25; C.I. Pigment Violet 32;

Chinacridone pigments: C.I. Pigment Orange 48 and 49; C.I. Pigment Red 122, 202, 206 and 209; C.I. Pigment Violet 19;

Chinophthalone pigments: C.I. Pigment Yellow 138;

Diketopyrrolopyrrolpigmente: C.I. Pigment Orange 71, 73 and 81; C.I. Pigment Red 254, 255, 264, 270 und 272;

Dioxazine pigments: C.I. Pigment Violet 23;

Flavanthrone pigments: C.I. Pigment Yellow 24;

Indanthrone pigments: C.I. Pigment Blue 60 and 64;

Isoindoline pigments: C.I. Pigment Yellow 139 and 185; C.I. Pigment Orange 61 and 69, C.I. Pigment Red 260;

Isoindolinone pigments: C.I. Pigment Yellow 109, 110 and 173;

Isoviolanthrone pigments: C.I. Pigment Violet 31;

Metalcomplex pigments: C.I. Pigment Red 257; C.I. Pigment Yellow 117, 129, 150, 153 und 177; C.I. Pigment Green 8;

Perinone pigments: C.I. Pigment Orange 43; C.I. Pigment Red 194;

Perylene pigments: C.I. Pigment Red 123, 149, 178, 179 and 224; C.I. Pigment Violet 29; C.I. Pigment Black 31 and 32;

Phthalocyanin pigments: C.I. Pigment Blue 15, 15:1, 15:2, 15:3, 15:4, 15:6, 16; C.I. Pigment Green 7, 36;

Pyranthrone pigments: C.I. Pigment Orange 51; C.I. Pigment Red 216;

Pyrazolochinazolone pigments: C.I. Pigment Orange 67 and C.I. Pigment Red 216;

Thioindigo pigments: C.I. Pigment Red 88 and 181; C.I. Pigment Violet 38;

Triarylcarbonium pigments: C.I. Pigment Red 81, 81:1 and 169; C.I. Pigment Violet 1, 2, 3 and 27; C.I. Pigment Blue 1, 61 and 62; C.I. Pigment Green 1;

C.I. Pigment Black 1 (Aniline black);

C.I. Pigment Yellow 101 (Aldazine yellow);

C.I. Pigment Brown 22.

Suitable inorganic pigments are e.g.

white pigments such as titanium dioxide (C.I. Pigment White 6) including crystal forms or modifications thereof, such as rutil or anatas, zinc oxide, zinc sulphide, zinc phosphate, lithopone;

black pigments: iron oxide black (C.I. Pigment Black 11), iron-manganese black, spinel black (C.I. Pigment Black 27); carbon black (C.I. Pigment Black 7); graphite (C.I. Pigment Black 10); chromium-iron-black (P. Brown 29);

inorganic colored pigments: chrome oxide, chrome oxide hydrate green; chrome oxide green (C.I. Pigment Green 48); cobalt green (C.I. Pigment Green 50); ultramarine greene; cobalt blue (C.I. Pigment Blue 28 und 36; C.I. Pigment Blue 72); ultramarine blue; blue manganese; ultramarine violet; cobalt- and manganese violet; red iron oxide (C.I. Pigment Red 101); cadmium sulfoselenides (C.I. Pigment Red 108); cerium sulfide (C.I. Pigment Red 265); molybdenum red (C.I. Pigment Red 104); ultramarine red; brown iron oxide (C.I. Pigment Brown 6 und 7), mixed brown, spinel phases and corundum phases (C.I. Pigment Brown 29, 31, 33, 34, 35, 37, 39 und 40), chromium titanium yellow (CI Pigment Brown 24), chrome orange; cerium sulfide (C.I. Pigment Orange 75); yellow iron oxide (CI Pigment Yellow 42); nickel titanium yellow (C.I. Pigment Yellow 53; C.I. Pigment Yellow 157, 158, 159, 160, 161, 162, 163, 164 und 189); Chromium titanium yellow; Spinel phases (CI Pigment Yellow 119); Cadmium sulfide and cadmium zinc sulfide (CI Pigment Yellow 37 and 35); Chrome yellow (CI Pigment Yellow 34); Bismuth vanadate (CI Pigment Yellow 184).

The luster pigments are single-phase or multi-phase construction lamellar pigments whose color play is characterized by the interplay of interference, reflection and absorption phenomena. Examples are aluminum platelets and one or more times, especially of metal oxides coated aluminum, iron oxide and mica platelets.

Suitable fillers are calcium carbonate, such as natural and precipitated chalksilicon dioxides, such as quartz powder and transparent silicon dioxide, silicates, talc, kaolin, natural and synthetic mica, barium sulphate, metal oxides and hydroxides, such as aluminium oxide and aluminium hydroxide.

The size of the pigment material is preferably in the micrometer range, e.g. the weight average particle diameter may range from 0.1 µm to 500 µm, in particular form 0.2 µm to 100 µm or from 0.5 µm to 50 µm. The weight average particle diameter is usually determined by light scattering methods, e.g. by the method of ISO 13320:2009. The weight average particle diameter may be also be determined by sieving analysis.

Generally, the aqueous pigment composition of the invention contains 10 to 70% by weight, in particular 20 to 50% by weight, based on the total weight of the composition, of the pigment component.

In the aqueous pigment composition of the invention the weight ratio of pigment component to dispersant composition, calculated in each case as solids, is frequently in the range from 20:1 to 1:5, in particular from 10:1 to 1:2. The concentration of the dispersant composition, calculated as solids and based on the total weight of the composition, is generally in the range from 1 to 30% by weight, in particular from 2 to 20% by weight.

The aqueous diluent present in the aqueous pigment composition of the invention will depend on the field of application in a known manner. Besides water the aqueous diluent may comprise polar, water-miscible solvents, such as $C_1$-$C_4$ alkanols, e.g. methanol, ethanol, isopropanol, propanol or n-butanol, glycol ethers like butyl glycol, or methoxypropylene glycol, polyols, e.g. glycerol, ethyleneglycol, diethyleneglycol, triethylene, triethylene glycol or propylene glycol. Frequently, water is the sole solvent. The amount of water in the pigment composition is frequently in the range of 20 to 89% by weight, or 20 to 88% by weight, in particular 30 to 77% by weight, based on the total weight of the liquid composition.

The aqueous pigment composition of the invention preferably contains at least one humectant. Suitable humectants include polyethylene glycols, polypropylene glycols and poly(ethyleneoxide-co-propylenoxides), which frequently have a number average molecular weight in the range from 200 to 1000 g/mol. The concentration of humectant will generally not exceed 30% by weight, in particular 20% by weight, and, if present, is frequently in the range from 0.1 to 30% by weight, in particular in the range from 1 to 20% by weight and especially in the range from 2 to 15% by weight.

The aqueous pigment composition of the invention is frequently formulated in a manner that it has a low VOC content and/or an low SVOC content. The term "low VOC content", as used herein refers to composition, wherein the concentration of low volatile organic compounds, as determined in accordance with DIN ISO 11890-2 is less than 1000 ppm. The term "low SVOC content" as used herein refers to composition, wherein the concentration of moderate volatile organic compounds, as determined in accordance with DIN ISO 11890-2 is less than 5000 ppm.

For preparing the pigment composition of the invention, the pigment component is usually dispersed in the aqueous diluent in the presence of the components A and B of the dispersant composition. The components A and B can be added jointly or separately to the aqueous diluent. The dispersion can be achieved by using conventional techniques, such as high speed mixing, ball milling, sand grinding, attritor grinding or two or three roll milling. The resulting pigment composition may have a pigment to dispersant weight ratio in the above range.

Depending on the intended use, the pigment composition may further comprise one or more conventional additives depending on the intended use. Conventional additives included e.g. rheology additives, non-ionic dispersants, flow auxiliaries, defoamers, pigment synergists, preservatives, and the like.

The pigment composition is frequently formulated as a pigment paste. Such a pigment paste contains the pigment component, the dispersant composition of the invention and an aqueous diluent and optionally additives but generally it will not contain binders.

The pigment compositions of the invention provide for good application properties such as high color strength, good dispersability in a multitude of liquid compositions. They are particularly useful as universal pigment preparations for tinting coating both solvent borne coating compositions and water-borne coating compositions. Hence, such a pigment composition compatible both with aqueous latex paints and silicate paints and also with solvent borne paints. The resulting paints have high color strength and do not show color change in the rub out-test, as described in DE 2202527.

Moreover, the pigment compositions of the invention provide for good dosage accuracy, when tinting both solvent borne coating compositions and water-borne coating compositions. The pigment compositions of the invention are stable and do not adhere to the interiors of the dosage machine and the valves and therefore ensure a consistent coloristic.

Suitable coating compositions, which can be colored with the pigment compositions of the invention include architectural coatings, industrial coatings, automotive coatings, radiation-curable coatings; paints, including paints for building exteriors and building interiors, for example wood paints, lime washes, distempers and emulsion paints. They can also be sued for coloring solvent borne printing inks, for example offset printing inks, flexographic printing inks, toluene gravure printing inks, textile printing inks, radiation-curable printing inks; waterborne inks, including inkjet inks and color filters.

The pigment compositions of the present invention are particularly useful as mixing components in color-mixing or -matching systems. Owing to their stir-in characteristics, they can be used directly as a pigment paste for this purpose. If desired, however, they can also be first converted into base colors, mixing varnishes and tinting colors (especially into colors having a high solids content, "HS colors"). The matching of the desired hue and hence the mixing of the color components can be effected visually via a system of color cards in a very large number of hue gradations which are based on color standards, such as RAL, BS and NCS, or preferably under computer control, whereby an unlimited number of hues become accessible ("computer color matching").

As explained above, the pigment composition may be included into a coating composition. Such a coating composition contains the pigment component, the dispersant composition, a liquid diluent and additionally one or more binders, e.g. film-forming polymers or prepolymers which form a film upon curing. Coating composition may optionally contain conventional additives conventionally used in coating technology, e.g. plasticisers, lubricants, emulsifiers, rheology additives, catalysts, flow auxiliaries, optical brighteners, flame retardants, preservatives, antistatic agents or blowing agents.

Suitable binders are the ones customarily used, for example, the ones described in *Ullmann's Encyclopedia of Industrial Chemistry*, 5th Edition, Vol. A 18, pp. 368-426, VCH, Weinheim 1991, Germany. In general, the film-forming binder is based on a thermoplastic or thermosetting resin, predominantly on a thermosetting resin. Examples thereof are alkyd, acrylic, polyester, phenolic, melamine, epoxy and polyurethane resins and mixtures thereof. Resins curable by radiation or air-drying resins can also be used. Binders may be also derived from polyvinylalcohol and polyvinylbutyral.

If cold- or hot-curable binders are used, the addition of a curing catalyst may be advantageous. Suitable catalysts that accelerate the curing of binders are described, for example, in *Ullmann's*, Vol. A18, loc. cit., p. 469.

Examples of coating compositions containing cold- or hot-curable binders are:
  Paints based on cold- or hot-cross linkable alkyd, acrylate, polyester, epoxy or melamine resins or mixtures of such resins, if desired with addition of a curing catalyst;
  Two-component polyurethane paints based on hydroxyl-containing acrylate, polyester or polyether resins and aliphatic or aromatic isocyanates, isocyanurates or polyisocyanates;
  One-component polyurethane paints based on blocked isocyanates, isocyanurates or polyisocyanates which are deblocked during baking, if desired with addition of a melamine resin;
  One-component polyurethane paints based on a tri-salkoxycarbonyl triazine cross linker and a hydroxyl group containing resin, such as acrylate, polyester or polyether resins;
  One-component polyurethane paints based on aliphatic or aromatic urethane acrylates or polyurethane acrylates having free amino groups within the urethane structure and melamine resins or polyether resins, if necessary with curing catalyst;

Two-component paints based on (poly)ketimines and aliphatic or aromatic isocyanates, isocyanurates or polyisocyanates;

Two-component paints based on (poly)ketimines and an unsaturated acrylate resin or a polyacetoacetate resin or a methacrylamidoglycolate methyl ester;

Two-component paints based on carboxyl- or amino-containing polyacrylates and polyepoxides;

Two-component paints based on acrylate resins containing anhydride groups and on a polyhydroxy or polyamino component;

Two-component paints based on acrylate-containing anhydrides and polyepoxides;

Two-component paints based on (poly) oxazolines and acrylate resins containing anhydride groups, or unsaturated acrylate resins, or aliphatic or aromatic isocyanates, isocyanurates or polyisocyanates;

Two-component paints based on unsaturated polyacrylates and polymalonates;

Thermoplastic polyacrylate paints based on thermoplastic acrylate resins or externally cross linking acrylate resins in combination with etherified melamine resins; and Paint systems based on siloxane-modified or fluorine-modified acrylate resins.

The invention is hereinafter also described by way of examples.

EXAMPLES

Abbreviations 1,2-CDA: 1,2-cyclohexane-dicarboxylicanhydride
AN: Acid number
AV: Amine number
CAc: citric acid monohydrate
DL-TAc: DL-tartaric acid
EO: ethyleneoxide
Eq.: equivalents
GA: glutaric anhydride
IA: itaconic anhydride
IAc: itaconic acid
MA: maleic anhydride
Mac: malic acid
Mn: molecular weight, number average
PA: phthalic anhydride
PBTAc: 2-phosphono-butan-1,2,4-tricarboxylic acid
PO: propyleneoxide
PPAc: polyphosphoric acid
PU polyurethane
PyA: pyromelliticdianhydride
SA: succinic anhydride
SC: solid content
sb: solvent borne
t-AAc: trans aconitic acid
TCAc: tricarballylic acid
VA: visual appearance
wb: water borne Preparation of Acid A:

In procedures A to X, the following compounds were used as component 1:
1a: $C_{10}$-oxoalcohol with 7 EO
1b: $C_{10}$-guerbet alcohol with 1 PO and 6 EO
1c: $C_{13}$-oxoalcohol with 7 EO
1d: $C_{10}$-guerbet alcohol with 6 EO
1e: $C_{10}$-oxoalcohol with 6 EO
1f: $C_{10}$-guerbet alcohol with 1 PO and 7 EO
1g: $C_{10}$-guerbet alcohol with 8 EO
1h: $C_{13}$-$C_{15}$-oxoalcohol with 7 EO
1i: $C_{10}$-oxoalcohol with 8 EO
1j: methoxypolyethylene glycol with Mn 500
1k: $C_{10}$-guerbet alcohol with 7 EO
1m: methoxypolyethylene glycol with Mn 350
1n: $C_{10}$-oxoalcohol with 11 EO
1o: $C_{16}$-$C_{18}$-fatty alcohol with 11 EO
1p: $C_{10}$-guerbet alcohol with 5 EO
1q: $C_{10}$-guerbet alcohol with 3 EO
1r: $C_{10}$-guerbetalcohol with 1 PO and 7 EO
1s: $C_{10}$-guerbetalcohol with 1 PO and 8 EO
1t: $C_{13}$-Oxoalcohol with 8 EO
1u: $C_{13}$-$C_{15}$-oxoalcohol with 8 EO General Procedure A Under a nitrogen atmosphere, polyalkyleneglycol monoalkylether (Component 1), an anhydride (Component 2) and catalyst (dibutyltindilaurate 0.15 wt %, based on the total weight of component 1 and 2)) were placed in a reactor at 22° C. on a 100 to 500 g scale. The contents were slowly heated to reaction temperature (100-150° C.) for several hours. Then the resulting product was cooled to 50° C. and filtered over a 125 μm filter. The acid value and solid contents were determined and summarized in table 1a below:

TABLE 1a

| Sample | Comp. 1 (Eq.) | Comp. 2 (Eq.) | T. [° C.] | Time [h] | AN [mg KOH/g] | SC [% bw] | VA |
|---|---|---|---|---|---|---|---|
| A1 | 1a (1.0) | GA (0.9) | 150 | 6 | 87 | 99 | Clear colorless liquid |
| A2 | 1b (1.0) | SA (0.9) | 100 | 12 | 92 | 99 | Clear colorless liquid |
| A3 | 1c (1.0) | GA (0.9) | 120 | 5 | 91 | 99 | Clear colorless liquid |
| A4 | 1d (1.0) | MA (0.9) | 120 | 5 | 106 | 92 | Clear brownish liquid |
| A5 | 1e (1.0) | PA (0.9) | 120 | 7.5 | 89 | 99 | Clear colorless liquid |
| A6 | 1f (1.0) | MA (0.9) | 120 | 5 | 91 | 93 | Clear yellowish liquid |
| A7 | 1g (1.0) | SA (0.9) | 120 | 5 | 93 | 99 | Clear colorless liquid |
| A8 | 1h (1.0) | SA (0.9) | 120 | 5 | 87 | 99 | Clear colorless liquid |
| A9 | 1h (1.0) | IA (0.9) | 120 | 4.5 | 62 | 99 | Clear brownish liquid |
| A10 | 1i (1.0) | 1,2-CDA (0.9) | 125 | 5 | 73 | 99 | Clear colorless liquid |
| A11 | 1j (2.2) | PyA (1.0) | 150 | 5 | 83 | 100 | Clear yellowish liquid |
| A12 | 1k (1.0) | MA (0.9) | 100 | 4 | 100 | 99 | Clear yellowish liquid |
| A13 | 1a (1.0) | SA (0.9) | 150 | 9 | 73 | 99 | Clear yellowish liquid |

TABLE 1a-continued

| Sample | Comp. 1 (Eq.) | Comp. 2 (Eq.) | T. [° C.] | Time [h] | AN [mg KOH/g] | SC [% bw] | VA |
|---|---|---|---|---|---|---|---|
| A14 | 1m (1.0) | SA (1.0) | 150 | 5 | 121 | 99 | Clear yellowish liquid |

General Procedure B

Under a nitrogen atmosphere, polyalkyleneglycol monoalkylether (Comp. 1), carboxylic acid (Comp. 2) and catalyst (dibutyltindilaurate 0.15 wt %) were placed in a reactor at room temperature and then heated to reaction temperature (160-180° C.). During several hours, reaction water was removed from the reactor until a calculated acid value was reached. Subsequent cooling of the light yellow liquid to 60° C. was followed by filtration over 125 μm filter. The acid value and solid content were determined and summarized in table 1 b below.

General Procedure C

Under a nitrogen atmosphere, polyethyleneglycol monoalkylether (Comp. 1), carboxylic acid (Comp. 2) and catalyst (dibutyltindilaurate 0.15 wt %) were placed in a reactor at room temperature and then heated up to reaction temperature (180° C.). During several hours, reaction water was removed from the reactor until the acid value has reached ≤15 mgKOH/g. Subsequent cooling of the light yellow liquid to 60° C. was followed by filtration over a 125 μm filter. The acid value and solid contents were determined and summarized in table 1c below:

For the preparation of samples A35 and A37, the product of the first step (Comp. 1) was placed in a reactor and an anhydride (Comp. 2) was added. No additional catalyst was added. The mixture was heated to 150° C. The reaction was stopped when the respective expected acid number was reached. Afterwards the product was cooled down to 60° C., filtered over a 125 μm filter and bottled. The acid value and solid contents were determined and summarized in table 1c below.

TABLE 1b

| Sample | Comp. 1 (Eq.) | Comp. 2 (Eq.) | T. [° C.] | Time [h] | AN [mg KOH/g] | SC [% bw] | VA |
|---|---|---|---|---|---|---|---|
| A15 | 1k (2.0) | CAc (1.0) | 160 | 8 | 56 | 93 | Turbid yellowish liquid |
| A16 | 1c (2.0) | CAc (1.0) | 160 | 10 | 35 | 100 | Clear orange liquid |
| A17 | 1n (2.0) | CAc (1.0) | 160 | 6 | 37 | 100 | Clear orange liquid |
| A18 | 1o (2.0) | CAc (1.0) | 160 | 7 | 39 | 100 | Creamy white substance |
| A19 | 1a (1.6) + 1j (0.4) | CAc (1.0) | 160 | 8.5 | 49 | 99 | Clear orange liquid |
| A20 | 1a (1.3) + 1j (0.7) | CAc (1.0) | 160 | 8 | 46 | 100 | Clear orange-brownish liquid |
| A21 | 1a (1.0) | MAc (1.0) | 160 | 7.5 | 87 | 99 | Clear yellowish liquid |
| A22 | 1p (2.0) | CAc (1.0) | 160 | 11.5 | 53 | 100 | Clear brownish liquid |
| A23 | 1q (2.0) | CAc (1.0) | 160 | 9.5 | 68 | 99 | Clear orange liquid |
| A24 | 1a (2.0) | CAc (1.0) | 160 | 6 | 48 | 99 | Clear yellow-orange liquid |
| A25 | 1e (1.0) | IAc (1.0) | 160 | 6 | 89 | 94 | Clear brownish liquid |
| A26 | 1r (1.0) | MAc (1.0) | 160 | 13 | 86 | 98 | Light turbid yellowish liquid |
| A27 | 1s (1.0) | DL-TAc (1.0) | 180 | 16 | 12 | 99 | Light turbid brownish liquid |
| A28 | 1t (2.0) | t-AAc (1.0) | 160 | 5 | 28 | 97 | Clear brown liquid |
| A29 | 1u (2.0) | TCAc (1.0) | 160 | 18 | 47 | 99 | Clear yellow liquid |
| A30 | 1m (1.0) | CAc (1.0) | 150 | 4 | 217 | 99 | Clear yellow liquid |
| A31 | 1m (2.0) | CAc (1.0) | 160 | 13 | 65 | 99 | Clear orange liquid |
| A32 | 1m (1.0) | DL-TAc (0.5) | 190 | 27 | 30 | 99 | Clear yellow liquid |
| A33 | 1m (1.0) | PBTAc (2.0) | 190 | 19 | 88 | 99 | Clear brown liquid |

TABLE 1c

| Sample | Comp. 1 (Eq.) | Comp. 2 (Eq.) | T. [° C.] | Time [h] | AN [mg KOH/g] | SC [% bw] | VA |
|---|---|---|---|---|---|---|---|
| A34 | 1a (1.0) + 1j (1.0) | DL-TAc (0.9) | 180 | 19 | 6 | 99 | Dark liquid |
| A35 | A34 (1.0) | SA (2.0) | 150 | 13 | 88 | 99 | Clear, dark brown liquid |
| A36 | 1b (2.0) | MAc (1.0) | 160 | 29 | 15 | 99 | Turbid yellow liquid |
| A37 | A36 (1.0) | MA | 100 | 13 | 55 | 99 | Clear, yellow liquid |

General Procedure D

Polyethylene glycol monoalkylether (component 1) was placed into a reactor under nitrogen atmosphere at room temperature. Component 1 was heated up to 60° C. inside temperature. This was followed by slow addition of polyphosphoric acid (tetraphosphoric acid (PPA 116) component 2)) under strong agitation. The mixture was heated to 80° C. and stirred for minimum 2 h. No solvent was added during the whole process.

The formed phosphoric acid esters were obtained as viscous, yellowish liquids at room temperature.

TABLE 1d

| Sample | Comp. 1 (Eq.) | Comp. 2 (Eq.) | T. [° C.] | Time [h] | SC [% bw] | VA |
|---|---|---|---|---|---|---|
| A38 | 1b (3.0) | PPA116 (1.0) | 60 → 80 | 3 | 99 | Clear, colorless liquid |
| A39 | 1j (1.0) | PPA116 (0.3) | 60 → 80 | 2 | 99 | colorless liquid |

Amines B

Melamine based amines (B1 to B9)

General Procedure E

A 250 ml four necked flask was charged at 22° C. with melamine resin, mono-alcohol and 0.5% by weight (based on reactants) of para-toluene sulfonic acid and rendered inert by flushing with $N_2$. Ingredients and molar ratios based on reactive methylethers of the melamine resin were used according to the table 2a below.

The reaction mass was heated with stirring to 110° C., and methanol was removed from the reactor under slight vacuum (ca. 800 mbar). The reaction was completed once no further methanol was collected in the receptor flask (duration ca. 6 hours). The final products were obtained as clear yellowish to orange liquids and used as such. Reactants, reaction conditions and properties of the obtained products are given in the following table 2a.

The following reactants were used:

Melamine Resins:

M1: Melamine-Formaldehyde resin, 6 fold methylated (Mw~390)

M2: Melamine-Formaldehyde resin, 3 fold methylated (Mw~260)

Alcohols:

A1: methoxypolyethylene glycol with Mn 500

A2: methoxypolyethylene glycol with Mn 350

A3: Oleyl alcohol

TABLE 2a

| Sample | Melamine resin | Alcohols (weight/equiv) | Time h | AV [mg KOH/g] | SC [%] | Visual appearance |
|---|---|---|---|---|---|---|
| B1 | M1 22.0 g | A1 112.7 g/ 4 eq. | 6 h then 2 h 135° C. | 16.0 | 99.5 | yellow clear liquid |
| B2 | M1 20.0 g | A3: 27.5 g/ 2 eq. A1: 102.4 g/ 4 eq. | 3 h | 16.3 | 99.0 | yellow clear liquid |
| B3 | M1 25.0 g | A2: 134.5 g/ 6 eq. | 5 h | 18.6 | 99.4 | yellow clear liquid |
| B4 | M2 28.0 g | A3 29.1 g/ 1 eq. A1 108.4 g/ 2 eq. | 6 h | 25.1 | 99.8 | orange clear liquid |
| B5 | M2 23.0 g | A2 133.6 g/ 3 eq. | 6 h | 18.7 | 99.7 | Yellow clear liquid |

General Procedure F a) Propanal Based Melamine Resins (Intermediate PM)

In a 600 ml four necked flask 54.0 g of melamine were suspended in 149.2 of 1-propanal. The mixture was heated to 40° C. and stirred for one hour. Then, 300 g of methanol were added, and the solution was refluxed at 65° C. until it became clear. The excess methanol was removed under vacuum until a viscous mass was left in the reactor. To this ethanol was added at 60° C. and then the obtained mixture was cooled to 5° C. Thereby, a precipitate was filtered off and dried in an oven yielding 109 g of a white powder (~65% yield of theory). The structure was confirmed with $^1$H NMR: each melamine group on average having 3 times reacted with propanal and methylated.

b) Intermediate PM of step A was reacted with monoalcohols by analogy to the general procedure E described above. Reactants, reaction conditions and properties of the obtained products are given in the following table 2b.

The following alcohols were used:

A1: methoxypolyethylene glycol with Mn 500

A2: methoxypolyethylene glycol with Mn 350

A4: C10-Oxoalcohol with 7 EO

TABLE 2b

| Sample | PM | Alcohols (weight/equiv) | Time [h] | AV [mg KOH/g] | SC [%] | VA |
|---|---|---|---|---|---|---|
| B6 | 25.0 g | A2 47 g/3 eq. | 4 h | 64.6 | 97.2 | Yellow clear liquid |
| B7 | 15.0 g | A1 40.3 g/3 eq. | 5 h | 50.5 | 99.5 | Yellow clear liquid |
| B8 | 11.0 g | A4 27.6 g/3 eq. | 5 h | 52.7 | 99.9 | orange slightly turbid liquid at 22° C. |

Amine B9

Into a 500 ml four necked flask melamine (75.7 g) and 1-propanal (232.3 g) were added and stirred under $N_2$ at reflux temperature at 45° C. for 30 min. Then 840 g of methoxypolyethylene glycol with Mn 350 and 4.8 g of para-toluene sulfonic acid were added to the reactor and stirred under reflux for another 3 hours. The volatiles were removed by vacuum destillation (500 mbar, max 110° C.). The resulting product (958 g) was obtained as a colorless clear liquid with a solid content of >95%.

Amine B10

A 250 ml four necked flask was charged at 22° C. with 21.05 g of trisalkoxycarbamatotriazine (1 equiv) with a molar ratio of the butyl to methyl esters being 75:25, 84 g of methoxypolyethylene glycol with Mn 350 (MPEG350, 3.5 equiv) and 0.5% of para-toluene sulfonic acid. The reaction mixture was heated to 150° C., and a methanol-butanol mixture was removed from the reactor under slight vacuum (ca. 800 mbar). The reaction was stopped, once no further alcohols were collected in the receptor flask (duration ca 6 hours). The final product was obtained as clear yellowish liquid and used without further purification. The final product had a solid content of 99.3% and an amine value of 30.1 mgKOH/g. $^1$H NMR showed >80% conversion of the butyl- and methylcarbamates to MPEG350 carbamates.

Polyethyleneimine Based Amines (B11 to B16)

B11: Commercial water-free polyethylene imine having a molecular weight of about 2000 g/mol and an amine value of 1300 mgKOH/g.

B12: Ethoxylated/propoxylated polyethyleneimine obtained by reacting a polyethyleneimine having molecular weight of 600 g/mol with 10 mol of EO and 7 mol of PO per reactive amine. The synthesis is described in example 3 of WO 2006/108856. The product was obtained as a brownish viscous liquid having an amine value of 56 mgKOH/g.

B13: Ethoxylated/propoxylated polyethyleneimine obtained by reacting a polyethyleneimine having molecular weight of 600 g/mol with 24 mol of EO and 16 mol of PO per reactive amine. The synthesis is described in example 1c of WO 2006/108856. The product was obtained as a yellow viscous liquid having an amine value of 33 mgKOH/g.

B14: Ethoxylated polyethyleneimine obtained by reacting a polyethyleneimine having molecular weight of 600 g/mol with 24 mol of EO per reactive amine. The synthesis is described in example 1 b of WO 2009/060059. The product was obtained as a yellowish viscous waxy solid having an amine value of 46 mgKOH/g. For handling reasons, this polymer was diluted to 80% solids in water to obtain a yellowish liquid.

B15: Ethoxylated polyethyleneimine modified with talloil fatty acid: Into a 250 ml four necked flask, equipped with a distillation bridge, thermometer, nitrogen inlet and overhead stirrer, 98.8 g of 100% of Amine B4 (previously melted at 60° C.) and 16.8 g talloil fatty acid were placed and heated to 160° C. under removal of water for 12 hours until the acid number reached <15 mg KOH/g. The final product was a brownish solid with a solid content of 99.6% and an amine value of 41.1 mg KOH/g.

B16: Propoxylated polyethyleneimine obtained by reacting a polyethyleneimine having molecular weight of 5000 g/mol and 1 mole of PO per amine. The synthesis was performed by analogy to example 1 described in WO 2006/108856, but using PO instead of EO. The amine value of the product was 650 mg KOH/g and the product was obtained as a yellowish highly viscous liquid.

Application Tests:

To reflect the broad applicability of the dispersant compositions of the invention on all pigment classes, the dispersants compositions were formulated as pigment pastes with a representative selection of pigments. The following pigments were employed:

"Hostaperm Violett RL-NF" (P.V. 23; Clariant), which is a difficult to disperse, organic pigment;
"Bayferrox 3910 LV" (P.Y. 42, Lanxess), which is a representative inorganic pigment;
"Spezialschwarz 100" (P.bk. 7; Evonik), which is a small sized carbon black pigment.

The pigment pastes were prepared by mixing the respective amount of pigment, universal dispersant, other components and the respective amount of water to obtain 40 g total weight according to table 3. Additionally 2 mm glass beads were added in a 1:1 weight ratio. After dispersing the paste for 4 h in a "DAS 200 Disperser" from LAU, the glass beads were removed by filtration. Pigment loading and weight ratio of dispersant/pigment is given in table 3a:

TABLE 3

Formulation of pigment pastes

| | Weight [g] of paste components | | |
|---|---|---|---|
| Components | P.V. 23 | P.Y. 42 | P.Bk. 7 |
| pigment | 4 | 22 | 12 |
| Dispersant composition | 4 | 4 | 3 |
| defoamer (FoamStar ® SI 2250) | 0.12 | 0.12 | 0.12 |
| water | 17.08 | 12.9 | 17.24 |
| humectant (PEG 200) | 4 | 0.38 | 3.6 |
| humectant (tripropylene glycol mono methylether) | 4 | — | 3.6 |
| sodium hydroxide (25% in water) | 0.8 | — | 0.44 |
| 2-amino-2-methylpropanol (90%) | — | 0.6 | — |
| filler (ASP 170) | 6 | — | — |
| total | 40 | 40 | 40 |

TABLE 3a

Selected pigment for application testing.

| Pigment | Pigment load [wt %] | Dispersant on pigment [wt %] |
|---|---|---|
| Spezialschwarz 100 | 30 | 25 |
| Bayferrox 3910 LV | 55 | 18.2 |
| Hostaperm Violett RL-NF | 10 | 100 |

After equilibration of the pigment pastes for minimum 12 h, their viscosity was determined with an "Anton Paar MCR 302" rheometer at 22° C. and a shear rate of 1 s$^{-1}$ with a cone-plate geometry.

After adding the pigment paste (5% of total paste) to a water borne and to a solvent borne polyurethane (PU) high-gloss finish, the pigmented formulations were applied to a metal substrate by draw down. After drying of the coating the color strength were measured by a "Konica Minolta 2600D" colorimeter. In the following tables 4a-4c the values are given relative to a benchmark which is defined as 100%.

Rub-out was determined as described in DE 2202527. For this, the high-gloss finish was coated on a glass plate. The coating was rubbed with the finger when still moist. If the pigment is flocculated, the flocculates are destroyed by shearing during the rubbing process, and the color changes compared to the unrubbed surface. The color difference was determined by a colorimeter by measuring the rubbed and unrubbed area, and given as DE grades.

The water-based high-gloss finish is based on a polyurethane-alkyd emulsion with a VOC-content of less than 40 g/l.

The solvent-based high gloss finish is based on a modified alkyd resin with a VOC-content of less than 300 g/l.

A dispersant combination of Dispex Ultra FA 4480 (oleo polyalkyleneether block copolymer) and Dispex Ultra FA 4483 (phosphoric ester based wetting agent) in the weight ratio 1:2 served as benchmark.

Viscosity of the pigment pastes, colors strength in a water borne and a solvent borne let down system and rub out (DE*) is shown in tables 4a-4c.

Results for "Spezialschwarz 100" (P.bk. 7) are shown in table 4a.

Results for "Bayferrox 3910 LV" (P.Y. 42) are shown in table 4b.

Results for "Hostaperm Violett RL-NF" (P.V. 23) are shown in table 4c.

TABLE 4a

Results for Spezialschwarz 100

| | Dispersant | | | Viscosity @1 s$^{-1}$ | Color strength [%] | | Rub out (DE) | |
|---|---|---|---|---|---|---|---|---|
| | Amine | Acid | Ratio | [mPas] | in wb PU | in sb PU | in wb PU | in sb PU |
| A | 4480 | 4483 | 1:2 | 6700 (±10%) | 100 (±2) | 100 (±2) | 1.4 | 0.3 |
| 1a | B14 | A1 | 4:6 | 127000 | 91 | 87 | 2.3 | 0.5 |
| 2a | B13 | A1 | 4:6 | 36100 | 99 | 85 | 1.9 | 1.0 |
| 3a | B12 | A1 | 4:6 | 6730 | 104 | 89 | 1.9 | 1.5 |
| 4a | B11 | A1 | 4:6 | 13300 | 84 | 95 | 1.4 | 0.5 |
| 5b | B14 | A9 | 3:7 | 4100 | 103 | 98 | 2.2 | 0.6 |
| 6b | B13 | A9 | 3:7 | 11500 | 104 | 90 | 2.0 | 0.9 |
| 7b | B16 | A9 | 3:7 | 24200 | 99 | 97 | 1.6 | 0.5 |
| 8a | B14 | A10 | 4:6 | 4830 | 103 | 96 | 1.2 | 0.1 |
| 9a | B13 | A10 | 4:6 | 19300 | 99 | 77 | 1.4 | 2.1 |
| 10a | B16 | A10 | 4:6 | 32600 | 85 | 94 | 1.2 | 0.5 |
| 15a | B14 | A6 | 4:6 | 4080 | 108 | 103 | 1.6 | 0.1 |
| 16a | B13 | A6 | 4:6 | 13500 | 102 | 91 | 1.5 | 1.2 |
| 17a | B11 | A6 | 4:6 | 10700 | 86 | 106 | 0.7 | 1.1 |
| 31a | B1 | A6 | 4:6 | 4600 | 103 | 73 | <1 | <1 |
| 32a | B1 | A7 | 4:6 | 3700 | 100 | 76 | <1 | <1 |
| 33a | B1 | A9 | 3:7 | 5400 | 98 | 59 | <1 | <1 |
| 34a | B1 | A38 | 4:6 | 3600 | 105 | 75 | <1 | <1 |
| 35a | B1 | A24 | 4:6 | 3500 | 103 | 75 | <1 | <1 |
| 36a | B2 | A25 | 5:5 | 2900 | 97 | 84 | <1 | <1 |
| 37a | B2 | A26 | 4:6 | 3000 | 87 | 90 | <1 | <1 |
| 38a | B2 | A10 | 4:6 | 3300 | 82 | 91 | <1 | <1 |

TABLE 4b

Results for Bayferrox 3910 LV

| | Dispersant | | | Viscosity @1 s$^{-1}$ | Color strength [%] | | Rub out (DE) | |
|---|---|---|---|---|---|---|---|---|
| # | Amine | Acid | Ratio | [mPas] | in wb PU | in sb PU | in wb PU | in sb PU |
| A | 4480 | 4483 | 1:2 | 22500 (±10%) | 100 (±2) | 100 (±2) | 1.3 | 0.4 |
| 11a | B14 | A7 | 4:6 | 72600 | 97 | 106 | 1.8 | 0.7 |
| 12a | B13 | A7 | 4:6 | 110000 | 99 | 107 | 1.8 | 0.6 |
| 13a | B12 | A7 | 4:6 | 62400 | 100 | 108 | 1.9 | 0.8 |
| 14a | B11 | A7 | 4:6 | 54800 | 104 | 265 | 2.0 | 3.1 |
| 2b | B13 | A1 | 3:7 | 127000 | 86 | 109 | 1.5 | 0.7 |
| 3b | B12 | A1 | 3:7 | 55600 | 91 | 100 | 2.0 | 0.8 |
| 4b | B11 | A1 | 3:7 | 160000 | 82 | 114 | 0.9 | 2.0 |
| 5a | B14 | A9 | 4:6 | 6650 | 105 | 105 | 2.3 | 0.8 |
| 6a | B13 | A9 | 4:6 | 17800 | 114 | 107 | 2.4 | 0.7 |
| 7a | B16 | A9 | 3:7 | 18000 | 109 | 117 | | |
| 15b | B14 | A6 | 3:7 | 8330 | 110 | 108 | 2.4 | 0.7 |
| 16b | B13 | A6 | 3:7 | 19800 | 107 | 106 | 2.4 | 0.7 |
| 17b | B11 | A6 | 3:7 | 87600 | 92 | 118 | 1.4 | 1.6 |
| 18a | B14 | A35 | 4:6 | 25000 | 103 | 85 | 2.0 | 1.7 |
| 19a | B13 | A35 | 4:6 | 42900 | 104 | 82 | 2.0 | 1.4 |

TABLE 4b-continued

Results for Bayferrox 3910 LV

| # | Dispersant Amine | Dispersant Acid | Dispersant Ratio | Viscosity @1 s$^{-1}$ [mPas] | Color strength [%] in wb PU | Color strength [%] in sb PU | Rub out (DE) in wb PU | Rub out (DE) in sb PU |
|---|---|---|---|---|---|---|---|---|
| 20a | B12 | A35 | 4:6 | 29100 | 101 | 64 | 2.0 | 2.3 |
| 21a | B16 | A35 | 4:6 | 39400 | 102 | 50 | 2.0 | 0.4 |
| 22b | B14 | A37 | 3:7 | 42400 | 108 | 78 | 2.0 | 1.3 |
| 23b | B12 | A37 | 3:7 | 27500 | 104 | 80 | 2.1 | 0.5 |
| 24b | B14 | A25 | 3:7 | 13300 | 104 | 106 | 2.6 | 0.7 |
| 25b | B13 | A25 | 3:7 | 38400 | 103 | 106 | 2.5 | 0.6 |
| 26b | B16 | A25 | 3:7 | 111000 | 99 | 123 | 1.9 | 1.9 |
| 27a | B14 | A29 | 4:6 | 100000 | 104 | 105 | 2.2 | 0.5 |
| 28a | B13 | A29 | 4:6 | 186000 | 104 | 105 | 2.3 | 0.7 |
| 29a | B12 | A29 | 4:6 | 132000 | 102 | 101 | 1.9 | 0.5 |
| 30a | B11 | A29 | 4:6 | 103000 | 92 | 118 | 1.6 | 1.8 |
| 31a | B1 | A6 | 4:6 | 14700 | 129 | 122 | <1 | <1 |
| 33a | B1 | A9 | 4:6 | 10500 | 114 | 106 | <1 | <1 |
| 34a | B1 | A38 | 4:6 | 30200 | 111 | 103 | <1 | |
| 35a | B1 | A24 | 4:6 | 57200 | 110 | 105 | <1 | <1 |
| 36a | B2 | A25 | 4:6 | 84300 | 110 | 99 | <1 | <1 |
| 37a | B2 | A26 | 4:6 | 36700 | 112 | 69 | <1 | <1 |
| 38a | B2 | A10 | 4:6 | 75100 | | | | |
| 40a | B4 | A4 | 4:6 | 14600 | 110 | 103 | <1 | <1 |

TABLE 4c

Results for Hostaperm Violett RL-NF

| # | Dispersant Amine | Dispersant Acid | Dispersant Ratio | Viscosity @1 s$^{-1}$ [mPas] | Color strength [%] in wb PU | Color strength [%] in sb PU | Rub out (DE) in wb PU | Rub out (DE) in sb PU |
|---|---|---|---|---|---|---|---|---|
| A | 4480 | 4483 | 1:2 | 11400 (±10%) | 100 (±2) | 100 (±2) | 1.8 | 0.3 |
| 15b | B14 | A6 | 3:7 | 6230 | 104 | 106 | 2.2 | 0.6 |
| 16b | B13 | A6 | 3:7 | 26000 | 99 | 85 | 2.2 | 1.8 |
| 17b | B11 | A6 | 3:7 | 39000 | 98 | 113 | 1.5 | 1.3 |
| 18a | B14 | A35 | 4:6 | 16300 | 97 | 92 | 2.0 | 1.6 |
| 19a | B13 | A35 | 4:6 | 23300 | 102 | 65 | 2.5 | 5.8 |
| 20a | B12 | A35 | 4:6 | 12100 | 99 | 92 | 1.9 | 1.4 |
| 21a | B16 | A35 | 4:6 | 36400 | 90 | 103 | 1.7 | 0.9 |
| 22b | B14 | A37 | 3:7 | 23200 | 93 | 99 | 1.7 | 0.5 |
| 23b | B12 | A37 | 3:7 | 31400 | 93 | 80 | 2.0 | 3.2 |
| 31b | B11 | A37 | 3:7 | 29800 | 92 | 116 | 1.2 | 1.4 |
| 5b | B14 | A9 | 3:7 | 25300 | 90 | 91 | 1.6 | 0.2 |
| 6b | B13 | A9 | 3:7 | 19400 | 90 | 84 | 2.0 | 2.8 |
| 7b | B16 | A9 | 3:7 | 14400 | 104 | 104 | 1.8 | 0.9 |
| 31a | B1 | A6 | 4:6 | 11200 | 99 | 103 | <1 | <1 |
| 32a | B1 | A7 | 4:6 | 12300 | 101 | 122 | <1 | <1 |
| 33a | B1 | A9 | 4:6 | 17200 | 101 | 108 | <1 | <1 |
| 34a | B1 | A38 | 4:6 | 5800 | 107 | 109 | <1 | <1 |
| 35a | B1 | A24 | 4:6 | 15300 | 105 | 112 | <1 | <1 |
| 36a | B2 | A25 | 4:6 | 12200 | 105 | 112 | <1 | <1 |
| 37a | B2 | A26 | 4:6 | 24600 | 97 | 108 | <1 | <1 |
| 38a | B2 | A10 | 4:6 | 8200 | 118 | 109 | <1 | <1 |
| 39a | B4 | A1 | 4:6 | 15500 | 100 | 96 | <1 | <1 |
| 39b | B4 | A1 | 3:7 | 29400 | 94 | 95 | <1 | <1 |
| 39c | B4 | A1 | 1:1 | 20400 | 116 | 74 | <1 | <1 |
| 40a | B4 | A4 | 4:6 | 10000 | 103 | 102 | <1 | <1 |
| 41a | B4 | A29 | 4:6 | 15200 | 111 | 89 | <1 | <1 |

We claim:

1. A dispersant composition comprising:

a) at least one oligomeric acid A, comprising
   at least one acidic group selected from the group consisting of COOH and PO$_3$H$_2$ and
   at least one polyoxyalkylene-ether radical of the formula (I) below $$R-(O-A)_x O-G- \qquad (I)$$

where A is an C$_2$-C$_4$-alkan-1,2-diyl radical;
where X is an integer having a number average value in the range from 2 to 20;
where R is hydrocarbon radical having from 1 to 30 carbon atoms; and
G is a chemical bond or a carbonyl group;
and b) at least one polyamine B, wherein each polyamine B is independently selected from the group consisting of a polyvinylamine, a poly-C$_2$-C$_3$-alkyleneimine, a modified poly-C$_2$-C$_3$-alkyleneimine, a poly-(C2-C4-alkyleneether) modified melamine, a poly-(C$_2$-C$_4$-alkyleneether) amine, a polyetheramine polyol, and a modified polyetheramine polyol;

wherein the weight ratio of the at least one oligomeric acid A to the at least one polyamine B is in a range of 20:80 to 80:20.

2. The dispersant composition of claim 1, wherein A in formula (I) is selected from the group consisting of ethan-1,2-diyl and propan-1,2-diyl; wherein x in formula (I) is an integer having a number average value in a range of 3 to 10; and wherein R in formula (I) is a $C_1$-$C_{30}$-alkyl.

3. The dispersant composition of claim 1, wherein the at least one oligomeric acid A comprises at least one carboxyl group.

4. The dispersant composition of claim 3, wherein the at least one oligomeric acid A is obtained by a process comprising reacting a polyether of formula (II) below $$R\text{—}(O\text{-}A)_x OH \quad \text{(II)}$$

where A is a $C_2$-$C_4$-alkan-1,2-diyl radical;
where x is an integer having a number average value in a range of 2 to 20;
where R is a hydrocarbon radical having from 1 to 30 carbon atoms;
with at least one polycarboxylic acid having a total of 3 to 12 carbon atoms and comprising 2, 3 or 4 carboxyl groups and optionally 1 or 2 hydroxyl groups or 1 phosphonic acid group, or with at least one anhydride thereof.

5. The dispersant composition of claim 4, wherein the at least one polycarboxylic acid and the at least one anhydride thereof are each at least one independently selected from the group consisting of maleic acid, maleic anhydride, phthalic acid, phthalic anhydride, glutaric acid, glutaric anhydride, succinic acid, succinic anhydride, 1,2-cyclohexanedicarboxylic acid, 1,2-cyclohexanedicarboxylic anhydride, itaconic acid, itaconic anhydride, fumaric acid, pyromellitic dianhydride, citric acid, malic acid, tartaric acid, propane-1,2,3-tricarboxylic acid, aconitic acid, isocitric acid, and 2-phosphonobutane-1,2,4-tricarboxylic acid.

6. The dispersant composition of claim 3, wherein the at least one oligomeric acid A has an acid number in a range of 20 to 200 mg KOH/g.

7. The dispersant composition of claim 1, wherein the at least one oligomeric acid A comprises a phosphate group —$OPO_3H_2$.

8. The dispersant composition of claim 7, wherein the at least one oligomeric acid A is obtained by a process comprising reacting a polyether of formula (II) below $$R\text{—}(O\text{-}A)_x OH \quad \text{(II)}$$

where A is a $C_2$-$C_4$-alkan-1,2-diyl radical;
where x is an integer having a number average value in a range of 2 to 20;
where R is a hydrocarbon radical having from 1 to 30 carbon atoms;
with at least one phosphatizing agent.

9. The dispersant composition of claim 1, wherein each polyamine B is at least one independently selected from the group consisting of a poly-$C_2$-$C_3$-alkyleneimine, a poly-$C_2$-$C_3$-alkyleneimine comprising at least one poly-($C_2$-$C_4$-alkyleneether) group, a poly-$C_2$-$C_3$-alkyleneimine comprising at least one poly-($C_2$-$C_4$-alkyleneether) group and comprising at least one ester group, and a melamine comprising at least one poly-($C_2$-$C_4$-alkyleneether) group.

10. The dispersant composition of claim 9, wherein each polyamine B is independently selected from the group consisting of a polyethyleneimine and a polyethyleneimine comprising at least one poly-($C_2$-$C_4$-alkyleneether) group.

11. The dispersant composition of claim 9, where each polyamine B is a melamine comprising at least one poly-($C_2$-$C_4$-alkyleneether) group.

12. A method of formulating an aqueous pigment composition, the method comprising: combining the dispersant composition of claim 1, at least one pigment component selected from the group consisting of a pigment and a filler, an aqueous diluent, and optionally a humectant.

13. An aqueous pigment composition, comprising: the dispersant composition of claim 1, at least one pigment component selected from the group consisting of a pigments and a filler, and an aqueous diluent.

14. The aqueous pigment composition of claim 13, further comprising at least one humectant.

15. The aqueous pigment composition of claim 13, wherein the weight ratio of the at least one pigment component to the dispersant composition, calculated in each case as solids, is in a range of 50:1 to 1:5.

16. The aqueous pigment composition of claim 13, comprising
i) 5 to 70% by weight, based on the total weight of the aqueous pigment composition, of the at least one pigment component;
ii) 2 to 30% by weight, calculated as solids and based on the total weight of the aqueous pigment composition, of the dispersant composition;
iii) optionally up to 30% by weight based on the total weight of the aqueous pigment composition, of at least one humectant; and
iv) 1 to 85% by weight, based on the total weight of the aqueous pigment composition, of the aqueous diluent.

17. A method of tinting water borne or solvent borne coating compositions, the method comprising: combining the dispersant composition of claim 1 and a water borne or solvent borne coating composition.

* * * * *